United States Patent [19]
Fujii et al.

[11] Patent Number: 5,455,722
[45] Date of Patent: Oct. 3, 1995

[54] A CASSETTE HAVING A RECORDING MEDIUM FOR USE WITH A RECORDING/REPRODUCING APPARATUS

[75] Inventors: Hiroshi Fujii, Tokyo; Shuichi Ota; Takashi Sawada, both of Kanagawa, all of Japan

[73] Assignee: Sony Corporation, Tokyo, Japan

[21] Appl. No.: 213,633

[22] Filed: Mar. 16, 1994

[30] Foreign Application Priority Data

Mar. 17, 1993 [JP] Japan .................................... 5-081194

[51] Int. Cl.$^6$ .......................... G11B 15/04; G11B 23/02
[52] U.S. Cl. ............................................. 360/60; 360/132
[58] Field of Search ........................... 360/60, 109, 132, 360/96, 93, 66, 118, 133

[56] References Cited

U.S. PATENT DOCUMENTS

| | | | |
|---|---|---|---|
| 3,950,786 | 4/1976 | Shapley | 360/60 X |
| 4,000,515 | 12/1976 | Fukawa | 360/60 |
| 4,106,064 | 8/1978 | Hoshido | 360/60 |
| 4,338,644 | 7/1982 | Staar | 360/132 |
| 4,734,812 | 3/1988 | Tanaka et al. | 360/60 X |
| 4,839,875 | 6/1989 | Kuriyama et al. | 369/14 |
| 4,860,127 | 8/1989 | Takahashi et al. | 360/60 |
| 5,041,923 | 8/1991 | Iwata et al. | 360/60 |
| 5,291,346 | 3/1994 | Baekgaard | 360/60 |

FOREIGN PATENT DOCUMENTS

| | | | |
|---|---|---|---|
| 879620 | 2/1980 | Belgium | 360/60 |
| 0476445 | 3/1992 | European Pat. Off. | 360/60 |
| WO91/02355 | 2/1991 | WIPO | 360/60 |
| WO91/05348 | 4/1991 | WIPO | 360/60 |
| WO93/14501 | 7/1993 | WIPO | 360/60 |

*Primary Examiner*—Donald Hajec
*Assistant Examiner*—Le, Thien Minh
*Attorney, Agent, or Firm*—William S. Frommer; Alvin Sinderbrand

[57] ABSTRACT

A cassette having a recording medium contained therein for use with a recording/reproducing apparatus. The cassette includes a storage device for storing information pertaining to the recording medium and/or the cassette; a plurality of terminals coupled to the storage device and adapted to be coupled to the recording/reproducing apparatus when the cassette is being used therewith so as to transfer the stored information to the recording/reproducing apparatus; and an accidental-erasure prevention switch member located in close proximity to the terminals for inhibiting recording of an information signal onto the recording medium and inhibiting erasing of a previously recorded information signal from the recording medium. At least one hole and a window are provided in the cassette so as to provide access to the terminals and the accidental-erasure prevention switch member. Such at least one hole and window may be arranged so as to provide a relatively large area for fastening a label. The recording/reproducing apparatus includes a connector which is coupled to the terminals when the cassette is inserted and mounted in the recording/reproducing apparatus and adapted to receive the information from the storage device.

23 Claims, 23 Drawing Sheets

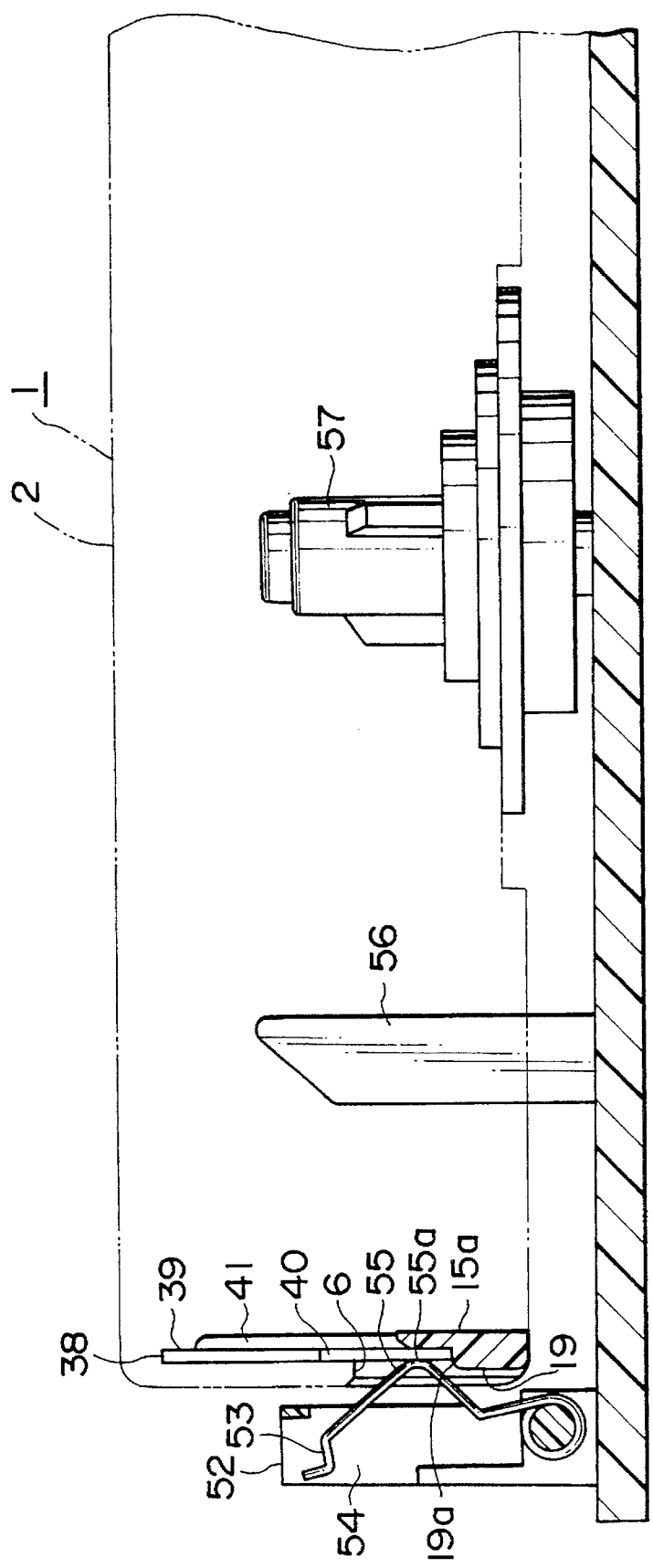

A CASSETTE HAVING A RECORDING MEDIUM FOR USE WITH A RECORDING/REPRODUCING APPARATUS

BACKGROUND OF THE INVENTION

1. Field of The Invention

The present invention relates to a cassette having a recording medium and a recording/reproducing apparatus and, more particularly, to such cassette for use with the recording/reproducing device and having a plurality of terminals for transferring informational data to the recording/reproducing apparatus and having a switch for inhibiting the recording of signal information onto or erasure of signal information from the recording medium.

2. Description of the Related

Typically, cassettes or cartridges are utilized to hold a recording medium, such as a magnetic tape. Such cassettes are used with recording/reproducing devices so as to record information onto and/or reproduce recorded information from the recording medium.

It may be desirable to supply or transmit informational data pertaining to the cassette to the recording/reproducing device, such as data pertaining to the type of recording medium contained within the cassette or data indicating whether information may be recorded onto or erased from the recording medium. Such cassette informational data would enable the recording/reproducing device to properly perform desired operations.

Further, it may also be desirable to automatically supply the cassette informational data to the recording/reproducing device upon the installation of the cassette into the recording/reproducing device.

Furthermore, it may still further be desirable to enable the automatic supply of cassette informational data to the recording/reproducing device upon the installation of the cassette into the recording/reproducing device such that the height of the recording/reproducing device is not affected.

OBJECTS AND SUMMARY OF THE INVENTION

An object of the present invention is to provide a cassette having a recording medium and a recording/reproducing device which provide the above-mentioned desired characteristics.

More specifically, it is an object of the present invention to provide a cassette having a plurality of terminals which may be contacted by respective contacts in a connector contained within the recording/reproducing device upon insertion and mounting of the cassette into the recording/reproducing device so as to enable the supply or transfer of cassette informational data from the cassette to the recording/reproducing device.

Another object of the present invention is to provide a cassette as aforesaid further having a switching member for activating an erasure prevention device, which activation may be detected by the recording/reproducing device upon the insertion and mounting of the cassette therein, so as to inhibit the erasing of a previously recorded information signal from the recording medium or the recording of an information signal onto the recording medium.

It is still another object of the present invention to provide a cassette as aforesaid in which the plurality of terminals are arranged within the cassette such that the connector in the recording/reproducing device has a height less than or equal to the height of the highest member inserted into the cassette when the cassette is installed into the recording/reproducing device so as not to increase the height of the recording/reproducing device.

Yet another object of the present invention is to provide a cassette as aforesaid in which at least one exposure hole and a window or opening are provided adjacent to one another in the cassette so as to provide access to the terminals and the erasure prevention switching member, respectively.

A further object of the present invention is to provide a cassette as aforesaid in which the at least one exposure hole and the opening are arranged on the cassette so as to provide a relatively large area for a label.

In accordance with an aspect of the present invention, a cassette having a recording medium adapted for use with a recording/reproducing device is provided. The cassette includes a cassette case holding the recording medium, a storage device for storing information pertaining to the cassette, a plurality of terminals coupled to the storage device and adapted to be coupled to the recording/reproducing device when the cassette is being used with the recording/reproducing device so as to transfer the stored information to the recording/reproducing device, and a device located in close proximity to the terminals for inhibiting recording of an information signal onto the recording medium and inhibiting erasing of a previously recorded information signal from the recording medium.

The present cassette may include a board having a plurality of terminals embedded therein which may be accessed through at least one exposure hole on an outer surface of a cassette case of the cassette. Each exposure hole may be located on a lower half of the outer surface of the cassette case. The cassette may further include an accidental-erasure prevention switch member and a window or opening for accessing a portion of such switch member in which such window may be formed on the outer surface of the cassette case above the at least one exposure hole. Upon accessing the portion of the accidental-erasure prevention switch member through the window, a user may cause the switch member to be slid along the cassette case so as to provide an indication for a recording/reproducing device which inhibits the recording of an information signal onto and the erasing of a previously recorded information signal from a recording medium contained within the cassette.

In the present cassette, the at least one exposure hole exposing the terminals and the window exposing the portion of the accidental-erasure prevention switch member may be arranged one above another such that one of the at least one exposure hole and the window is located within the width of the other. As a result, a relatively large area on the cassette is available for fastening a label thereto.

The recording/reproducing device according to the present invention is adapted to record signals onto and/or reproduce signals from a recording medium contained within a cassette, wherein the cassette includes a board having a plurality of terminals embedded therein which may be accessed through at least one exposure hole on an outer surface of the cassette. The recording/reproducing device may include a connector having a plurality of connector pins or contacts adapted to respectively engage the terminals of the cassette upon inserting and mounting the cassette in the recording/reproducing device. The connector being located within the recording/reproducing device such that the height thereof is lower than the height of a highest member which is to be inserted into the cassette upon mounting the same in the recording/reproducing device. In other words, the connector in the present recording/reproducing device is arranged such that the overall height of the recording/reproducing device is no greater than that of a conventional recording/reproducing device.

Other objects, features and advantages according to the present invention will become apparent from the following detailed description of illustrated embodiments when read in conjunction with the accompanying drawings in which corresponding components are identified by the same reference numerals.

BRIEF DESCRIPTION OF THE DRAWINGS

FIG. 23 is a cross-sectional view illustrating the cassette of FIG. 1 mounted in a recording/reproducing apparatus;

DETAILED DESCRIPTION OF THE PREFERRED EMBODIMENTS

Figure 1:
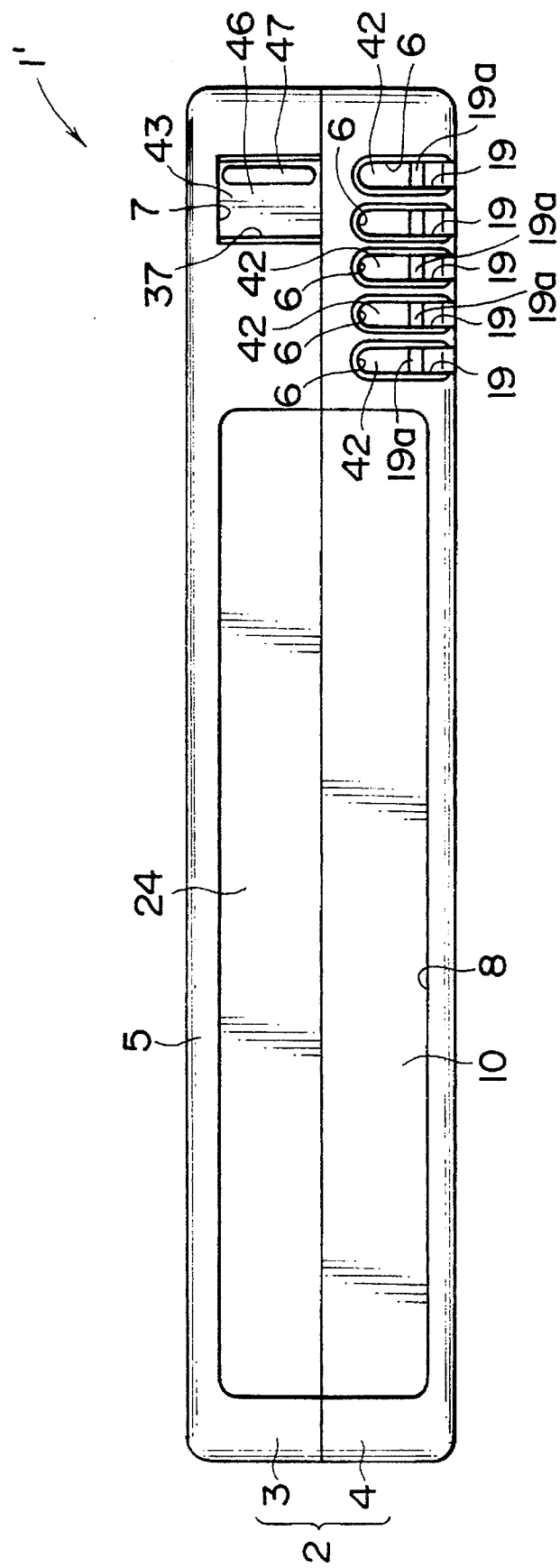
FIG. 1 illustrates a back surface of a cassette having a recording medium in accordance with a first embodiment of the present invention.

FIGS. 1–21 illustrate a cassette 1 having a recording medium contained therein in accordance with a first embodiment of the present invention. Such recording medium may be a magnetic tape and, accordingly, the cassette may be a tape cassette for use in a video tape recorder (VTR). However, the present cassette is not so limited. For example, the present cassette may contain other types of recording medium. However, in the following discussion, the present cassette will be described as a tape cassette, although as just described the present cassette is not so limited.

The cassette 1 includes a cassette case 2, which generally has a shape of a rectangular box. The cassette case 2 includes an upper half 3 and a lower half 4, each formed with relatively thin walls and each having an inside and outside portion. Such cassette case 2 being formed by joining together the inside portions of the upper and lower halves 3 and 4, respectively. Although not shown in the figures, accommodated inside the cassette case 2 may be a magnetic tape and two rotatable tape reels for winding the magnetic tape, in which the two ends of the magnetic tape are respectively fixed to the tape reels.

As previously mentioned, the cassette 1 may be utilized with a VTR. In such a situation, the cassette 1 is normally inserted into the VTR such that a back surface 5 is inserted first. The entire back surface 5 of the tape cassette tape 1 is illustrated in FIG. 1.

Unless otherwise specifically noted in describing the relative locations of the portions or members of the cassette 1, the right and left thereof will be the right and left as viewed towards the back surface 5 of the cassette case 2 as in FIG. 1, and the rear and front will be in a direction towards the back surface 5 and a direction away from the back surface in a perpendicular direction thereto, respectively.

As shown in FIG. 1, the back surface 5 includes a plurality of exposure holes 6 arranged on a lower portion on the right side thereof. The back surface 5 further includes an accidental-erasure prevention window 7 arranged on the right side of the upper half 3 above the exposure holes 6. The back surface 5 still further includes a label area 8. Such label area is adapted for having a label, which may contain information pertaining to the cassette 1, fastened or stuck thereto.

A portion of the lower half 4 located basically in a right rear portion thereof will now be more fully described with reference to FIGS. 1–11.

As shown, for example, in FIGS. 2, 3, 6 and 9, the inside of a right rear portion of the lower half 4 of the cassette case 2 includes a partition 9 which has a substantially circular-arc shape. One end of the partition 9 is coupled to a wall 10 of the rear portion of the lower half 4, whereas the other end is coupled to a wall 11 on the right side of the lower half. Such partition 9 limits the area in which the tape reels and magnetic tape may be located.

A shallow dent 12 is formed in the inner surface of the rear wall 10 from a predetermined height up to an upper end thereof. The shallow dent 12 is formed over a continuous area of the rear wall 10 extending from the right end thereof to the partition 9 as, for example, shown in FIGS. 2–4, 6, 7, 9 and 10.

Figure 5:
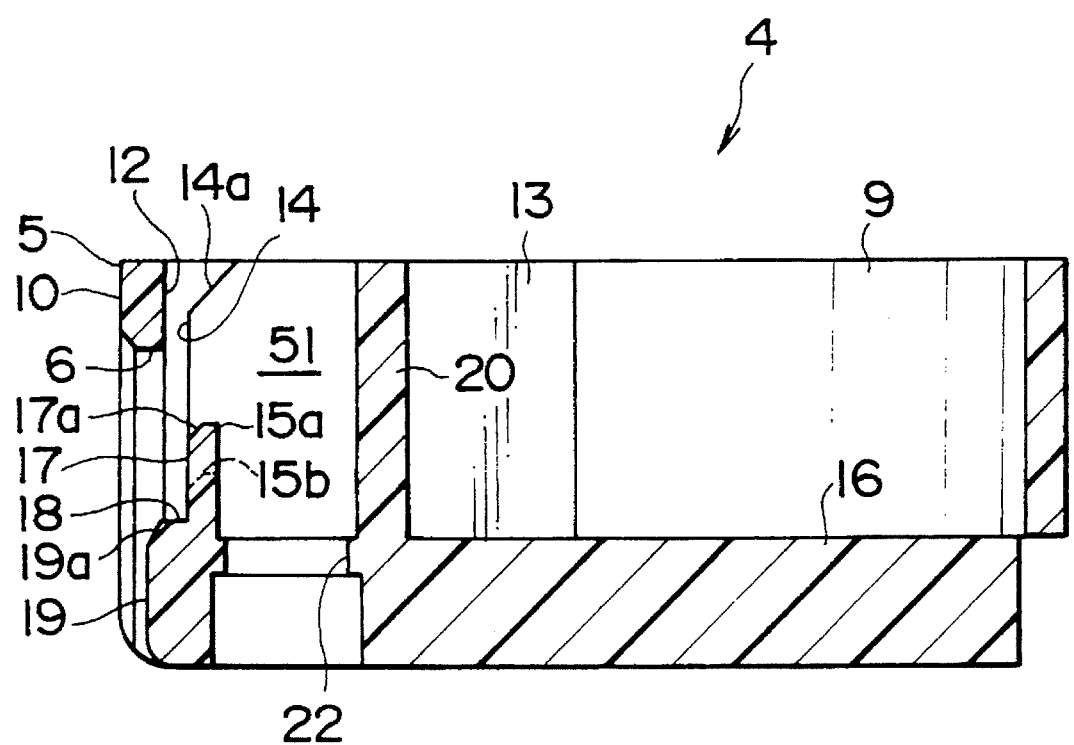
FIG. 5 is a cross-sectional view along a line V—V shown in FIG. 3.
Figure 6:
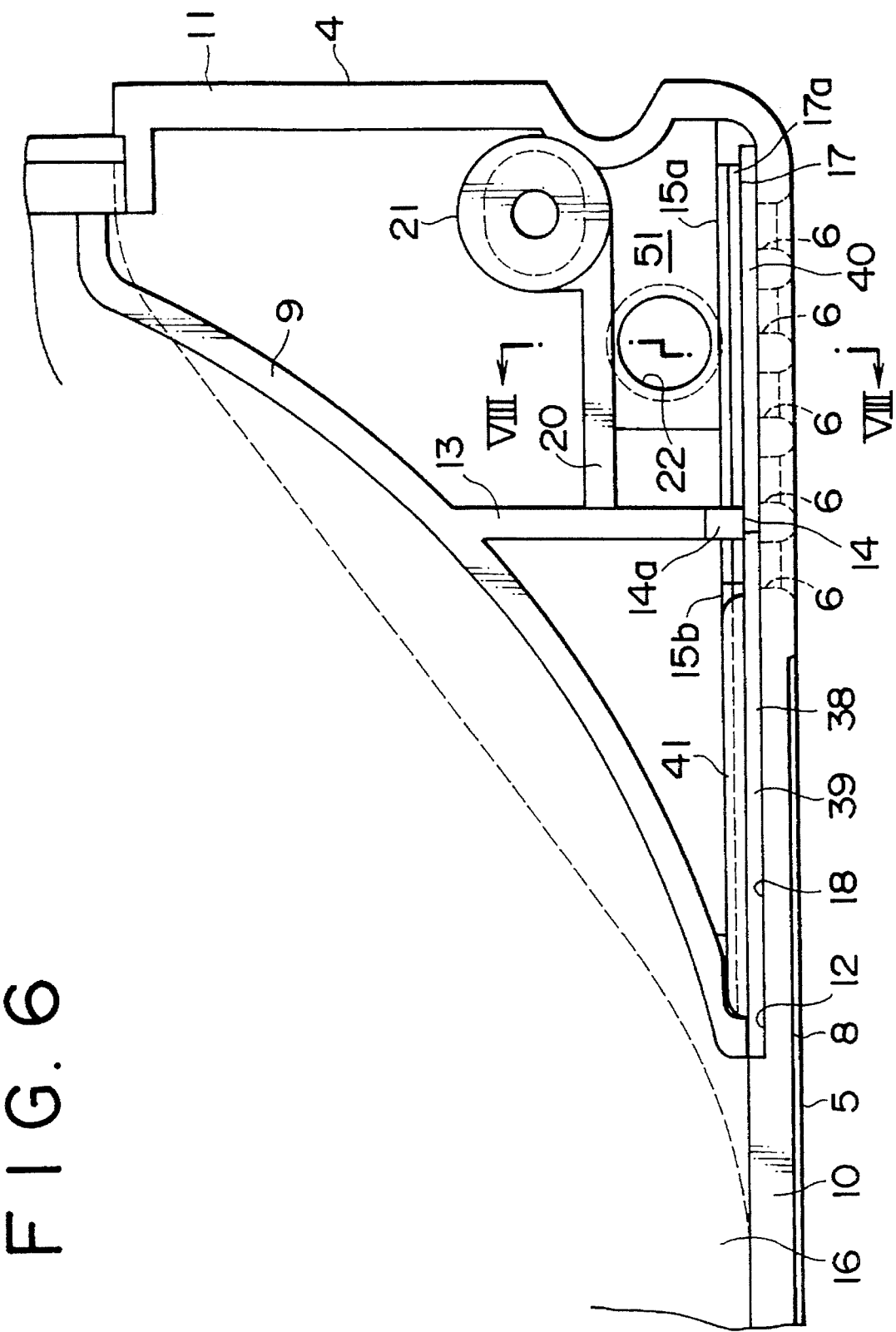
FIG. 6 is an enlarged partial top view of the lower half of the cassette case of the cassette of FIG. 1 illustrating a board arranged therein.
Figure 7:
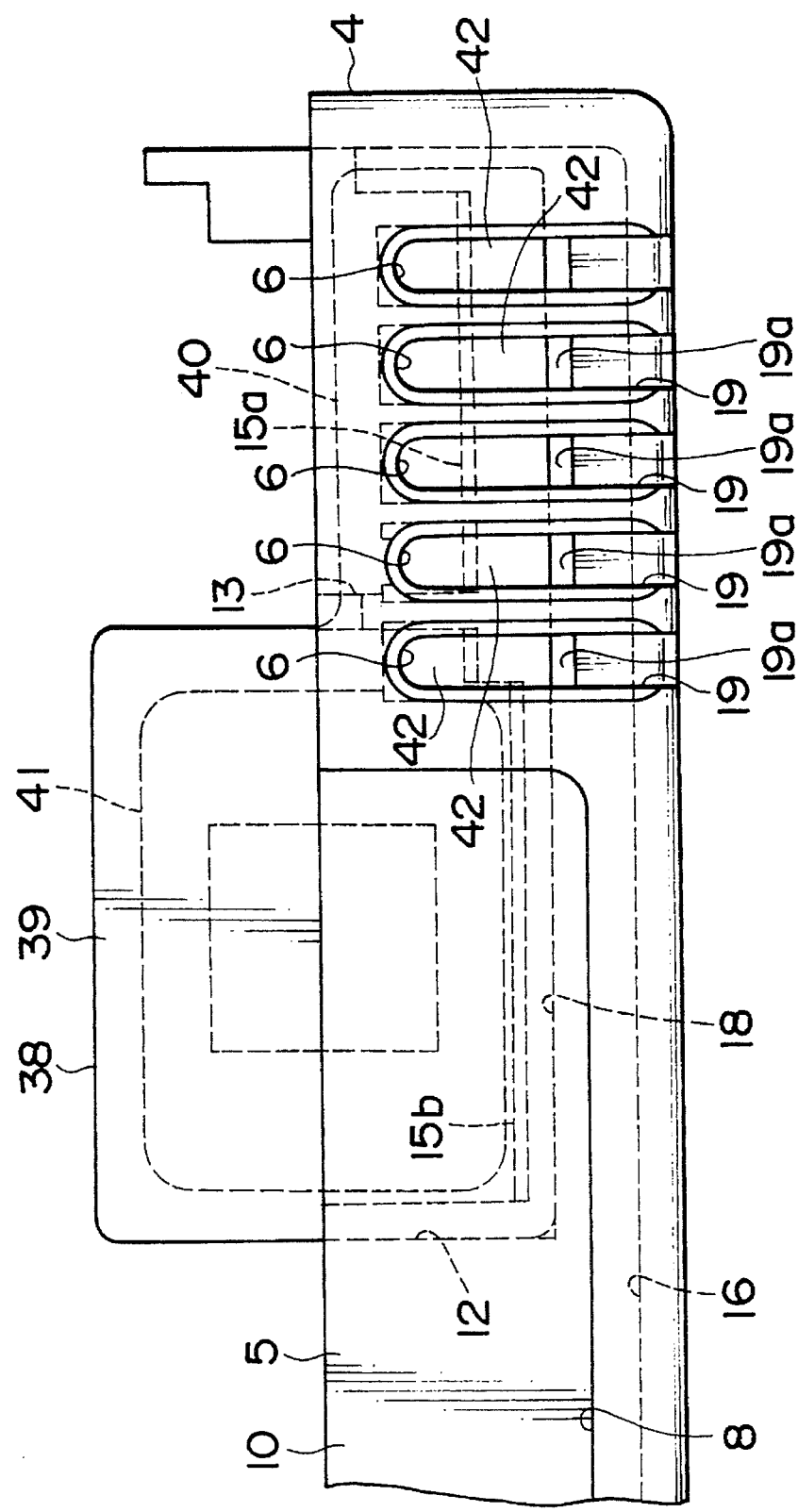
FIG. 7 is an enlarged partial back view of the lower half of the cassette case of the cassette of FIG. 1 illustrating the board arranged therein.
Figure 8:
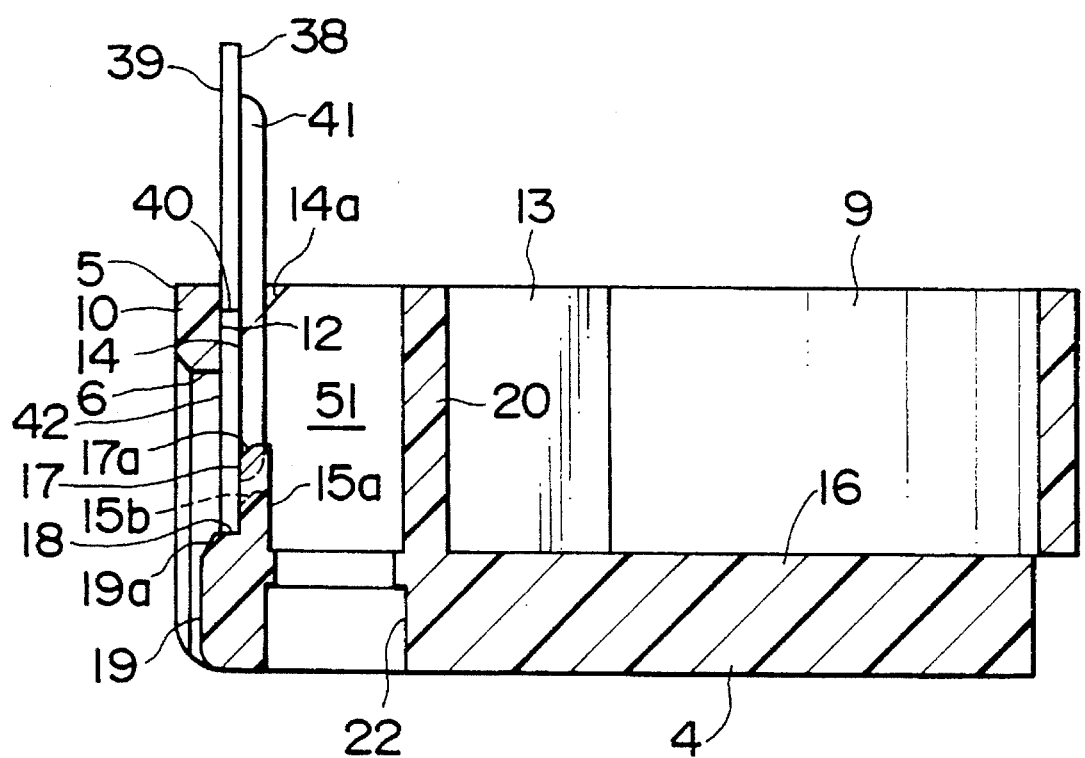
FIG. 8 is a cross-sectional view along a line VIII—VIII shown in FIG. 6.
Figure 9:
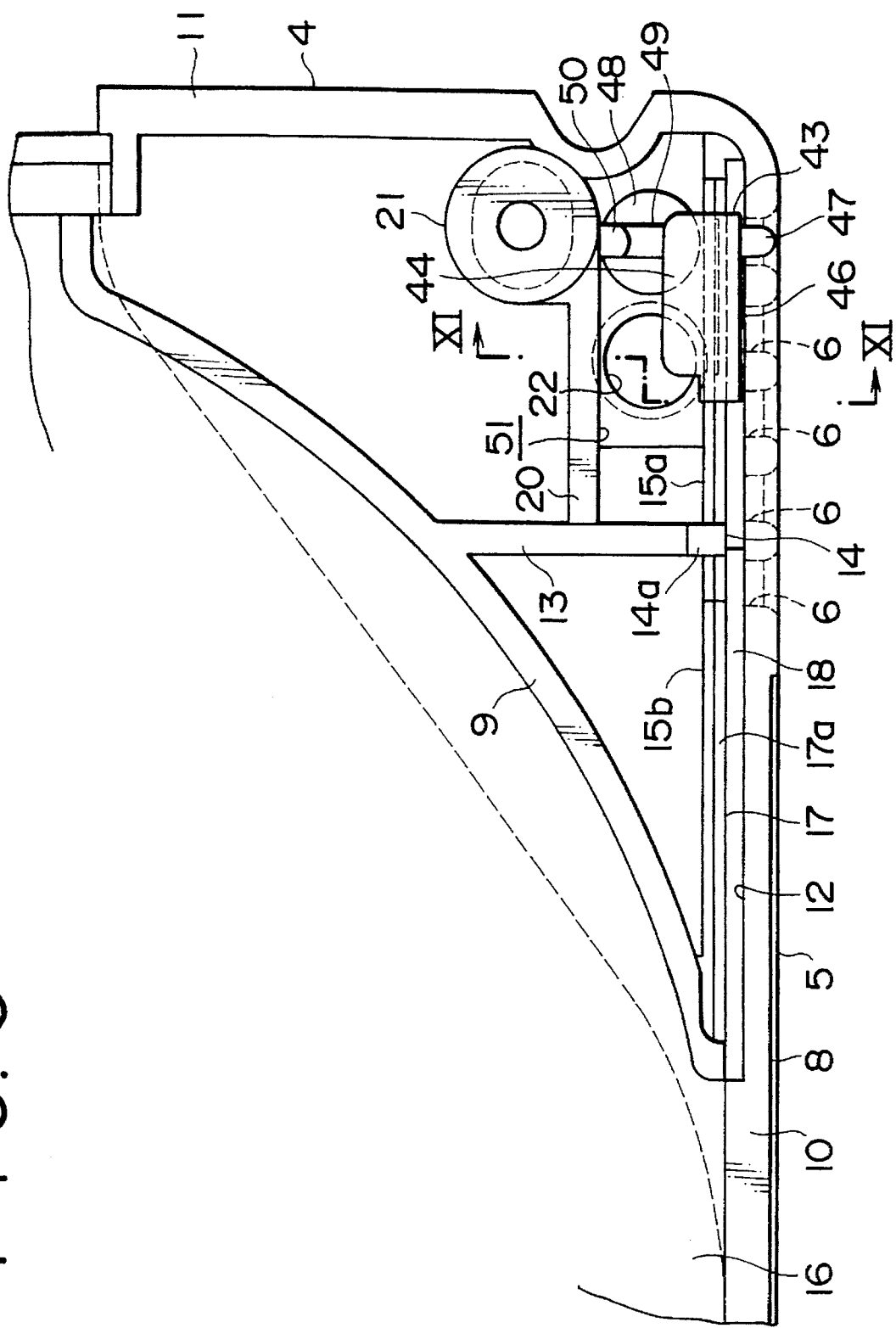
FIG. 9 is an enlarged partial top view of the lower half of the cassette case of the cassette of FIG. 1 illustrating an accidental-erasure prevention switch arranged therein.
Figure 10:
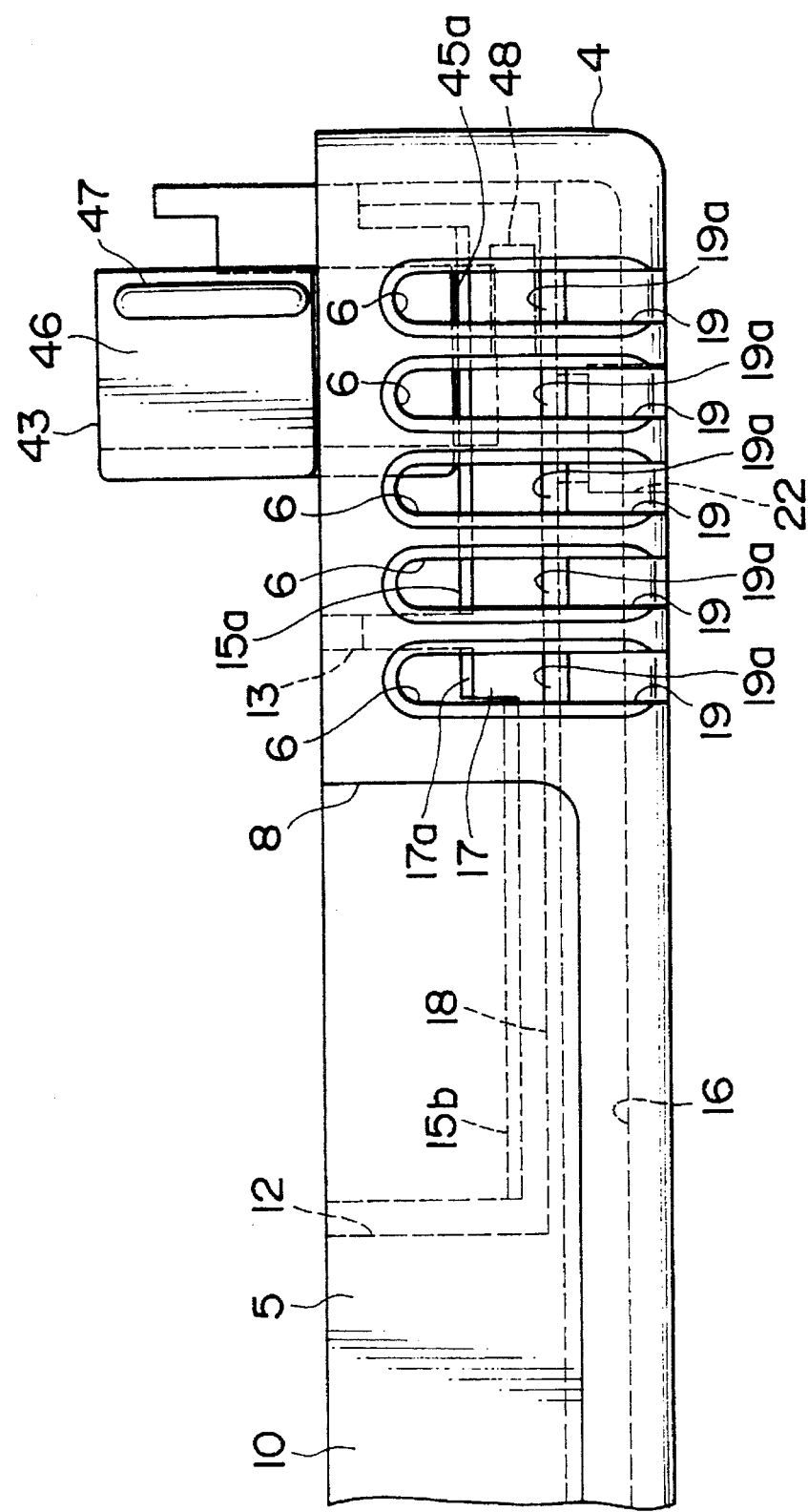
FIG. 10 is an enlarged partial back view of the lower half of the cassette case of the cassette of FIG. 1 illustrating the accidental-erasure prevention switch arranged therein.

An intermediate wall 13 extends from approximately the middle of the partition 9 towards the rear of the lower half 4 as shown, for example, in FIGS. 2, 3, 6 and 9. Further, as shown in FIG. 5, a rear edge 14 of the intermediate wall 13 is located adjacent to, but separated by a relatively small distance from, an inner surface of the shallow dent 12. An upper end of the rear edge 14 has a slope edge 14a which slopes in an upward/downward direction as, for example, shown in FIGS. 2 and 5.

As, for example, shown in FIGS. 3, 5, 6 and 8, weight walls 15a and 15b are formed from a bottom wall 16 of the lower half 4 in the rear right part of the lower half. The amount in which the weight walls 15a and 15b protrude from the bottom wall 16 is less, and may be only slightly less, than the amount in which the rear wall 10 protrudes from the bottom wall. Such weight walls 15a and 15b are arranged so as to be separated by relatively small distances from the inner surface of the shallow dent 12. The weight walls 15a and 15b have rear surfaces 17, which are aligned with the rear edge 14 of the intermediate wall 13. Upper ends of the rear surfaces 17 of the weight walls 15a and 15b have slope surfaces 17a and 17b, respectively, which slope in an upward/downward direction.

A bearing groove 18 is formed between the inner surface of the shallow dent 12, and the rear surfaces 17 of the weight walls 15a and 15b and the rear edge 14 of the intermediate wall 13, as, for example, shown in FIGS. 3, 5, 6, 8, 9 and 11.

The previously mentioned exposure holes 6 are formed through the rear wall 10 up to the shallow dent 12. Upper ends of the exposure holes 6 are located slightly below an upper end of the rear wall 10. Shallow guide grooves 19 are formed at a portion below each of the exposure holes 6 on the back surface 5 of the rear wall 10 and extend to approximately the lower end thereof (see, for example, FIGS. 1, 2, 4 and 5). Slope edges 19a are formed on upper ends of inner surfaces of the shallow guide grooves 19 and slope in an upward/downward direction (see, for example, FIGS. 5 and 8).

A limit wall 20 is formed in the rear right portion of the lower half 4 and is arranged therein so as to be coupled to the intermediate wall 13 at a position approximately in the middle of the intermediate wall and extending therefrom in a substantially right direction to the wall 11, as shown, for example, in FIGS. 2, 3, 6 and 9.

An insert hole 22 is formed in the bottom wall 16. As shown, for example, in FIGS. 3, 5, 6, 8, 9 and 11, such insert hole is located in the bottom wall 16 in a right rear portion of the lower half 4 which is substantially defined by the rear wall 10, the right-side wall 11, the intermediate wall 13 and the limit wall 20, and has a center which is located at a position slightly to the left from the center of such portion of the bottom wall of the lower half defined by walls 10, 11, 13 and 20.

The portion on the upper half 3 located in a right rear part thereof and corresponding to that previously described in the lower half 4 will now be described with reference to FIGS. 12–14.

The inside portion of the upper half 3 includes a partition 23. The partition 23, like the partition 9 of the lower half 4, has a substantially circular or cylindrical-arc shape and limits the area in which the tape reels and magnetic tape may be located. The partition 23 has a location corresponding to that of the partition 9. That is, the partition 23 is formed on the inside portion of the right side of a rear part of the upper half 3 as, for example, shown in FIG. 12. One end of the partition 23 is coupled to a rear wall 24 of the upper half 3, while the other end is coupled to a right-side wall 25.

A shallow dent 26 is formed in the inner surface of the rear wall 24 from its lower end up to a predetermined height from the lower end thereof. The shallow dent 26 ranges continuously from the right end of the rear wall 24 to the partition 23 as, for example, shown in FIGS. 12 and 13. Such shallow dent 26 is a counterpart of the shallow dent 12 of the lower half 4 previously described.

An intermediate wall 27 is formed in the upper half 3 at a location therein corresponding to that of the intermediate wall 13 in the lower half 4. That is, as shown in FIG. 12, the intermediate wall 27 extends from approximately the middle of the partition 23 towards the rear of the upper half 3. Further, as shown in FIG. 14, a rear edge 28 of the intermediate wall 27 is located in front of, but separated from, the shallow dent 26. A lower end of the rear edge 28 has a slope edge 28a which slopes in an upward/downward direction, as shown in FIG. 14.

Figure 12:
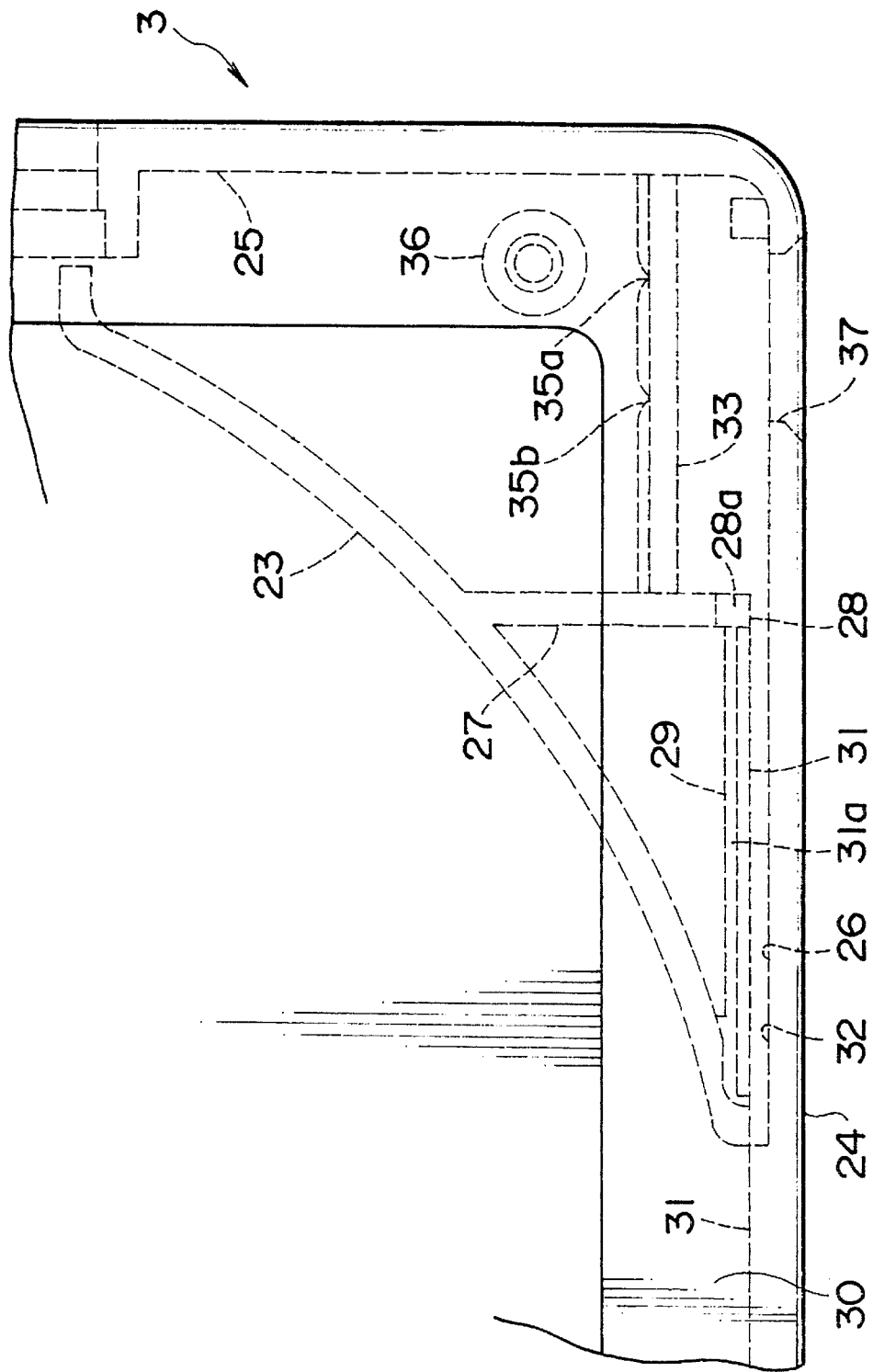
FIG. 12 is an enlarged partial top view of an upper half of the cassette case of the cassette of FIG. 1.
Figure 14:
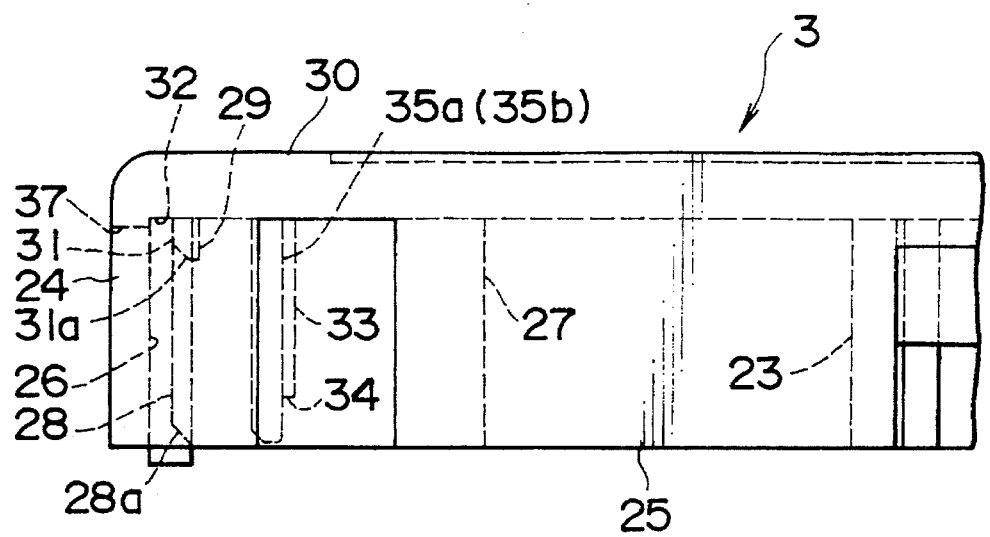
FIG. 14 is an enlarged partial right side view of the upper half of the cassette case of the cassette of FIG. 1.
Figure 15:
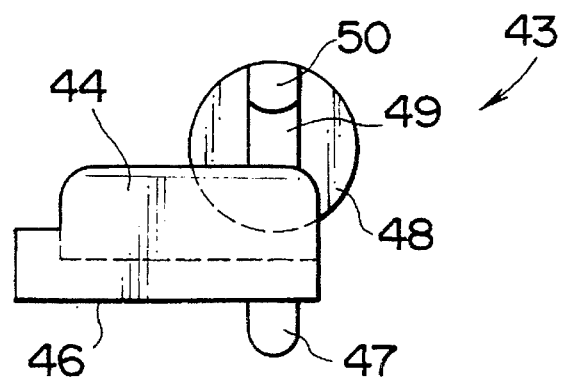
FIG. 15 is an enlarged top view of the accidental-erasure prevention switch.
Figure 16:
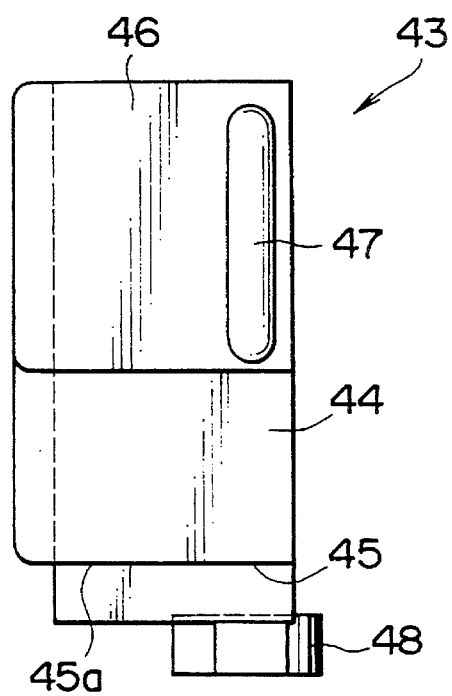
FIG. 16 is an enlarged back view of the accidental-erasure prevention switch.

A weight wall 29 is formed from a ceiling-surface wall 30 between the intermediate wall 27 and one end of the partition 23, as shown, for example, in FIGS. 12 and 14. A rear surface 31 of the weight wall 29 is aligned with the rear edge 28 of the intermediate wall 27. The lower end of the rear surface 31 has a slope edge 31a, which slopes in an upward/downward direction, as shown in FIG. 14. The weight wall 29 protrudes from the ceiling-surface wall 30 an amount less than, which amount may be approximately one-fifth, that in which the rear wall 24 protrudes from the ceiling-surface wall 30.

Figure 13:
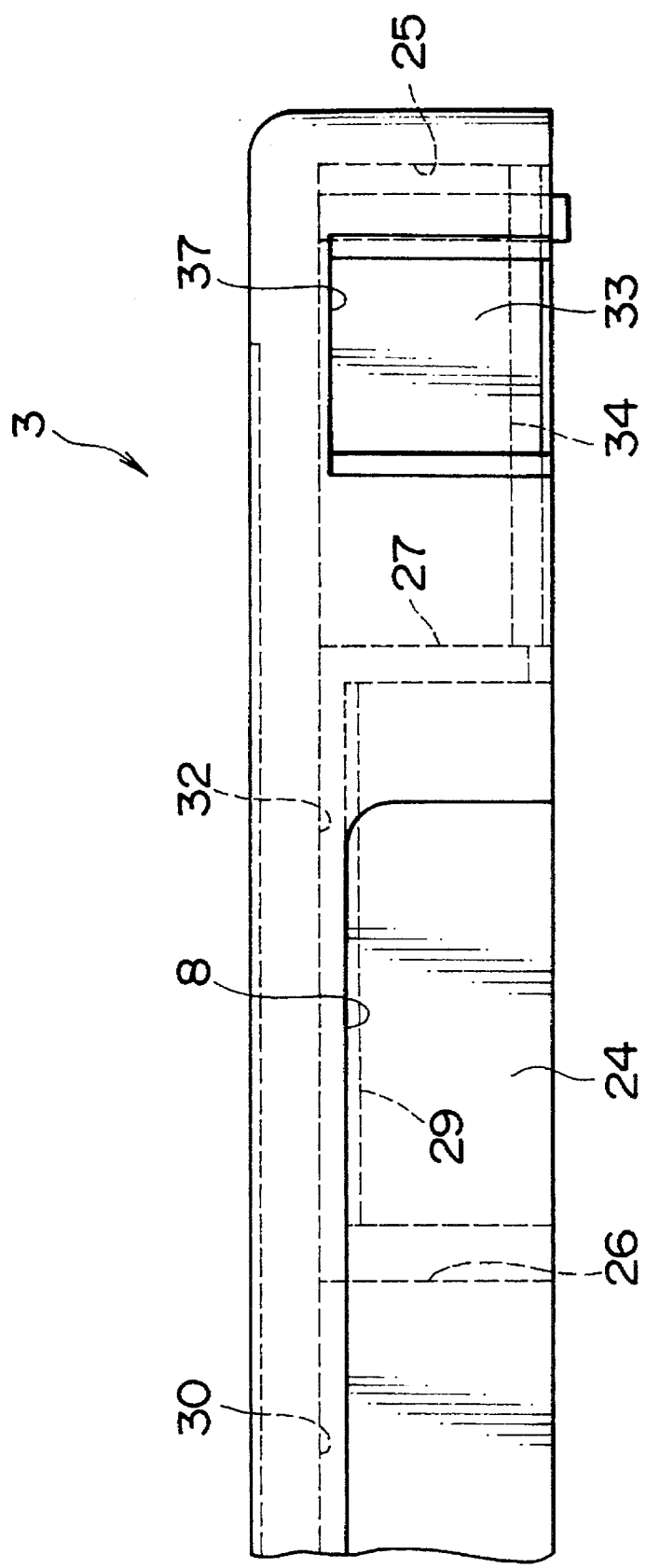
FIG. 13 is an enlarged partial back view of the upper half of the cassette case of the cassette of FIG. 1.

As shown in FIGS. 12–14, a bearing groove 32 is formed between the rear surface 31 and the previously described shallow dent 26.

A limit wall 33 is formed from the ceiling-surface wall 30 and extends from a rear portion of the intermediate wall 27 to the right-side wall 25, as shown in FIG. 12. Such limit wall 33 protrudes from the ceiling-surface wall 30 approximately the same amount as that of the rear wall 24 from the ceiling-surface wall 30 as shown in FIG. 14.

As shown in FIGS. 13 and 14, a cut 34 is formed along the entire length of the lower end of the front surface of the limit wall 33. Click grooves 35a and 35b are respectively formed in the right portion and the approximate center of the front surface of the limit wall 33, other than in the portion of such front surface having the cut 34, as shown in FIGS. 12 and 14. Such click grooves extend in an upward/downward direction in the front surface of the limit wall 33.

A boss unit 36 is formed from the ceiling-surface wall 30 at a location corresponding to that of a boss unit 21 (FIG. 2) of the lower half 4. That is, as shown in FIG. 12, such boss unit 36, is located in front of the right end of the limit wall 33.

As shown in FIGS. 12–14, the right end of the rear wall 24 includes a rectangular cut 37. When the upper and lower halves 3 and 4 are joined together as shown in FIG. 1, the cut 37 and the upper edge of the rear wall 10 of the lower half 4 form the accidental-erasure prevention window 7.

Figure 2:
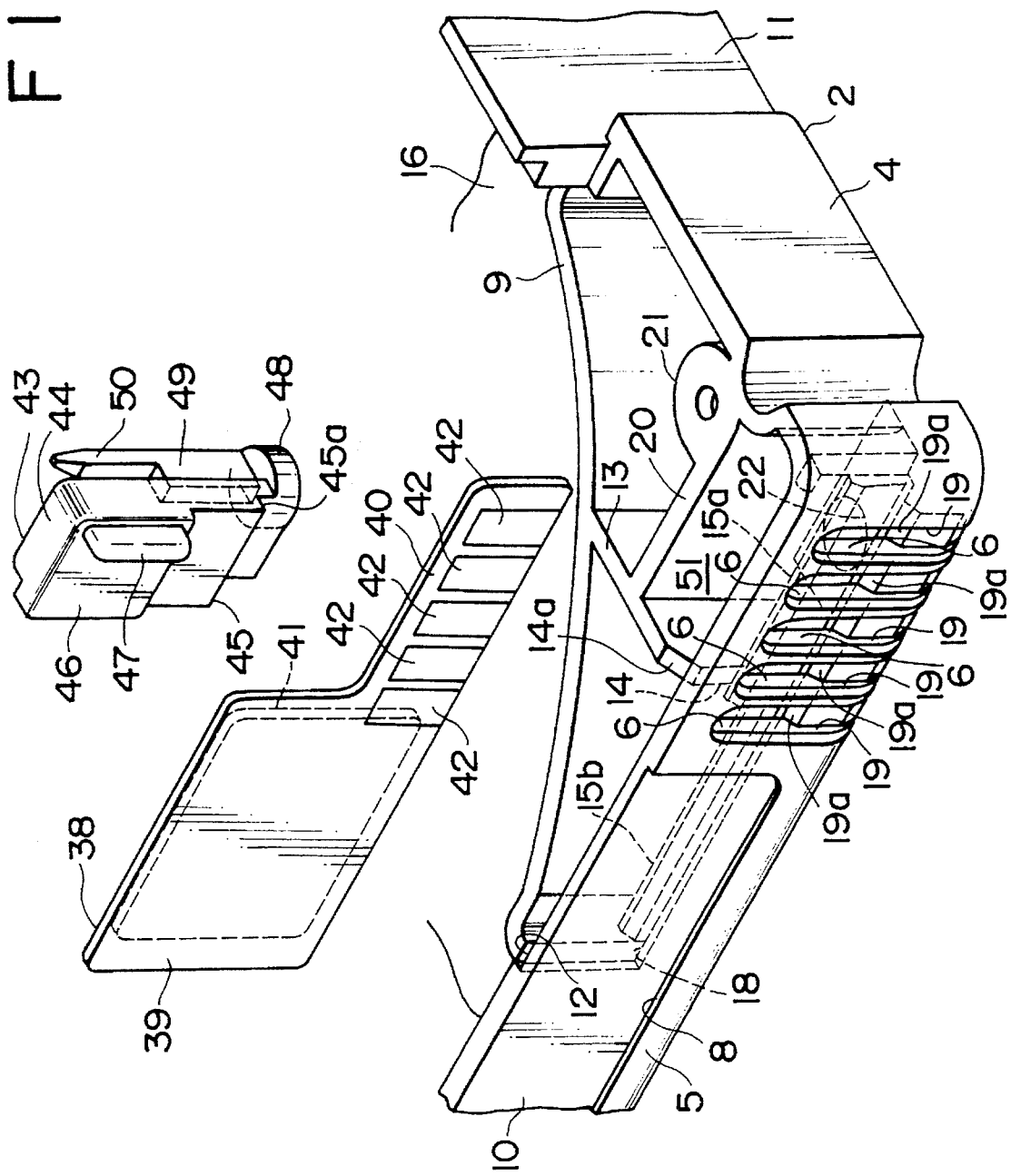
FIG. 2 is an enlarged partial perspective view of the cassette of FIG. 1.
Figure 3:
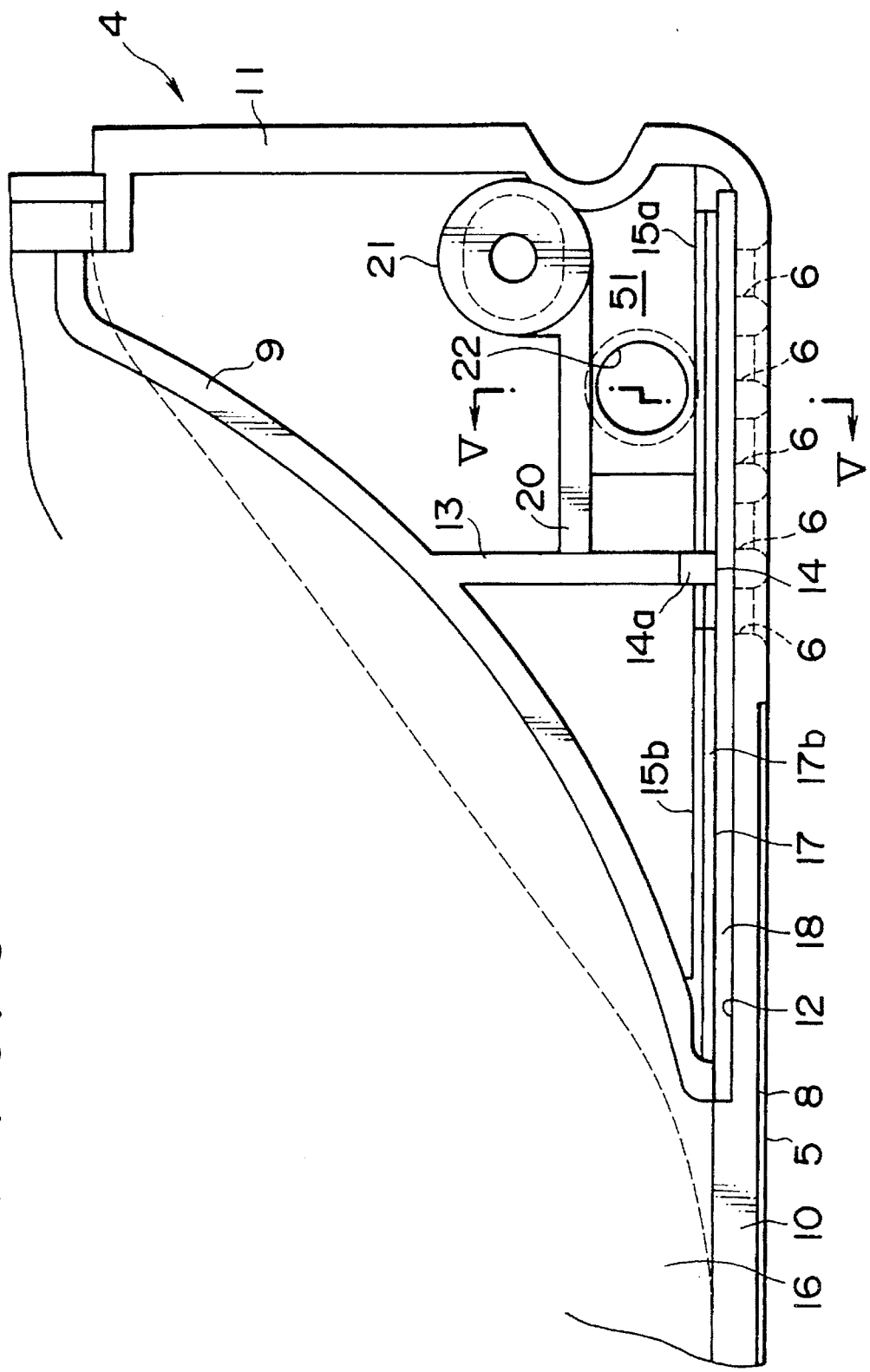
FIG. 3 is an enlarged partial top view of a lower half of a cassette case of the cassette of FIG. 1.
Figure 4:
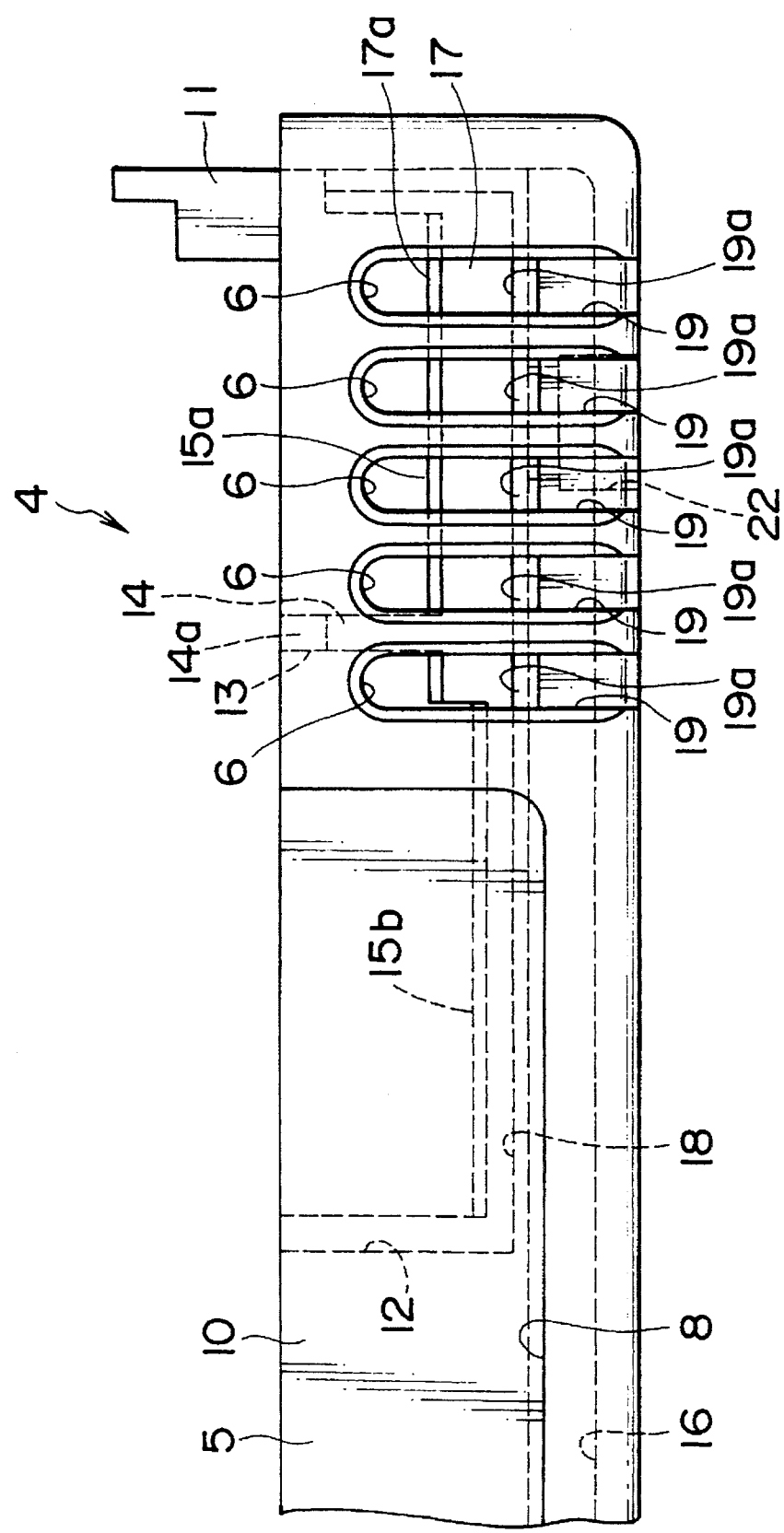
FIG. 4 is an enlarged partial back view of the lower half of the cassette case of the cassette of FIG. 1.

The cassette 1 includes a board 38 having an integrated circuit (IC) mount unit 39 and a terminal layout unit 40, as shown for example in FIG. 2. The IC mount unit 39 preferably has a rectangular shape having a width slightly greater than its height. The terminal layout unit 40 preferably has a rectangular shape having a height which is approximately half that of the IC mount unit 39 and a width approximately equal to that of the IC mount unit. Such terminal layout unit 40 is attached to the right lower edge of the IC mount unit 39 so as to form the board 38.

As shown for example in FIG. 2, an IC 41 is mounted on the front surface of the IC mount unit 39. Information including that to be transferred to the recording/reproducing apparatus upon the installation of the cassette therein as hereinafter described may be stored in the IC 41. Such stored information may include information relating to the recording medium, the cassette, and so forth. A plurality of rectangular terminals 42 are mounted on the back surface of the terminal layout unit 40. The terminals 42 are connected to the IC 41 and respectively arranged from the right end to the left end of the terminal layout unit 40.

Figure 21:
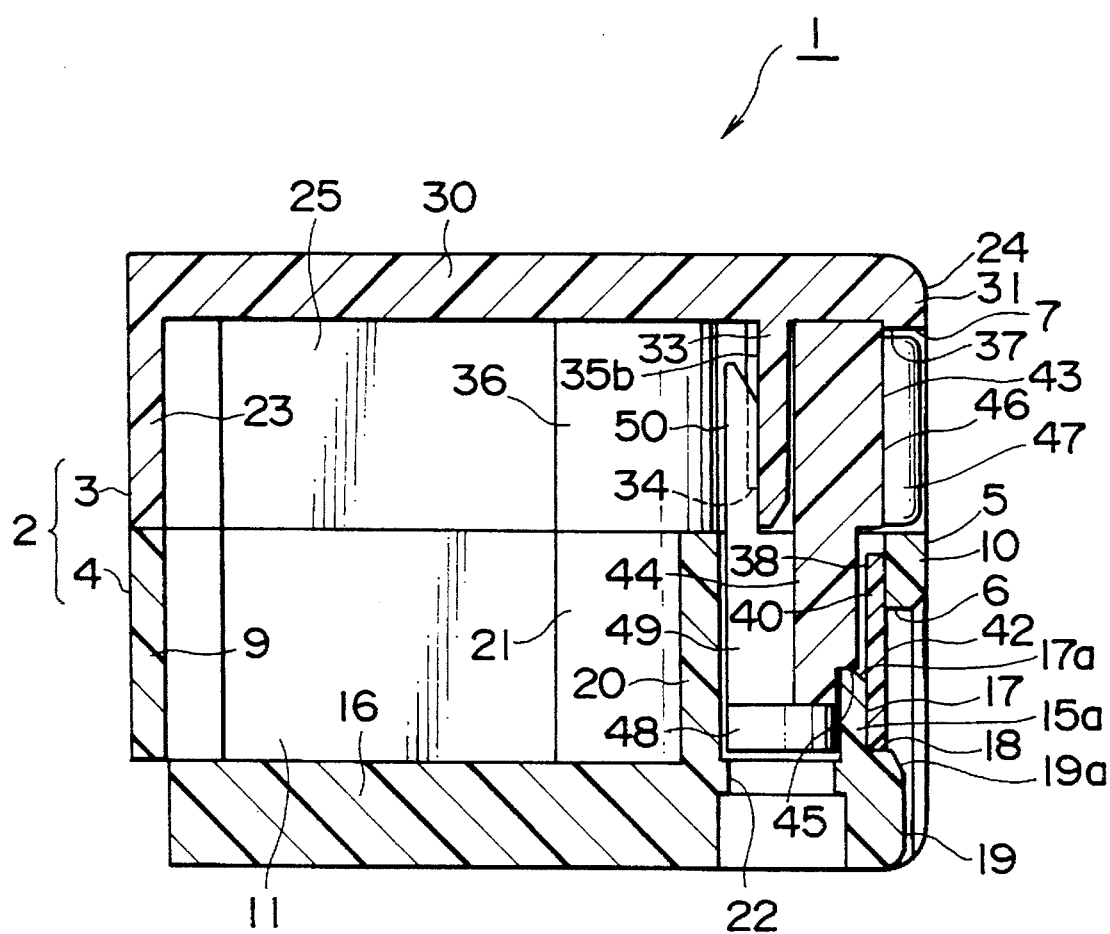
FIG. 21 is a cross-sectional view along a line XXI—XXI shown in FIG. 19.
Figure 22A:
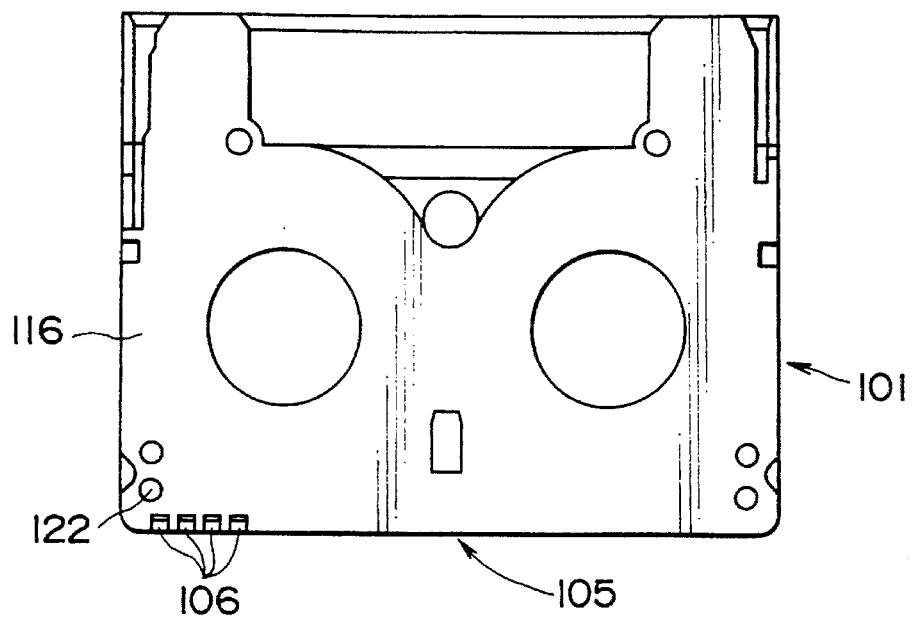
FIG. 22A is a bottom view of a cassette having a recording medium in accordance with a modification to the first embodiment of the present invention.
Figure 22B:
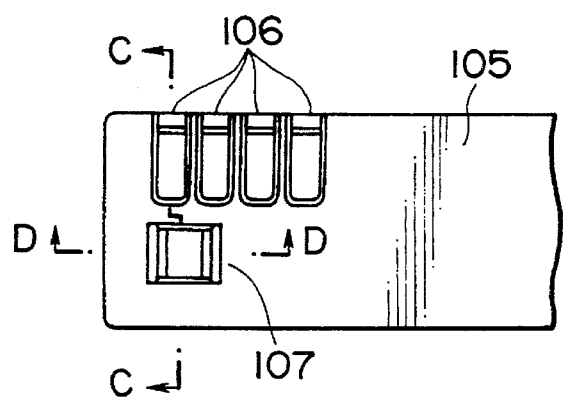
FIG. 22B is a partial back view of the cassette of FIG. 22A.
Figure 22C:
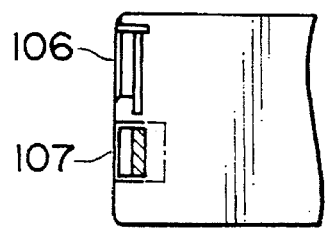
FIG. 22C is a partial cross-sectional view along a line C—C shown in FIG. 22B.
Figure 22D:
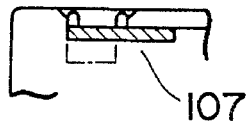
FIG. 22D is partial cross-sectional view along a line D—D shown in FIG. 22B.

The board 38 is arranged at the right rear portion of the cassette 1, as shown for example in FIGS. 2 and 21. That is, the lower edge of the board 38 is plugged into the bearing groove 18 formed on the lower half 4. When the upper and lower halves 3 and 4 are joined together, the upper edge of the IC mount unit 39 of the board 38 is plugged into the bearing groove 32 on the upper half 3. In such situation, the terminals 42 are arranged so as to be respectively aligned with the exposure holes 6 on the rear wall 10 of the lower half 4 as shown, for example, in FIGS. 1 and 7.

As shown in FIG. 2, the cassette 1 further includes an accidental-erasure prevention switch member 43, which may be fabricated from an elastic resin compound. Such accidental-erasure prevention switch member 43 has a principal part 44, which may have a substantially rectangular or oblong shape.

As shown, for example, in FIGS. 2, 11, 16, 17 and 21, the principal part 44 includes a cut 45 formed along the entire width of the rear surface of the lower end thereof. Further, protruding from approximately the upper half of the principal part 44 in the backward direction is a display unit 46. A gadget pin 47, which has substantially a rib form and which extends in a substantially vertical direction, protrudes from the right end of the back surface of the display unit 46. The color of the back surface of the display unit 46 is preferably an easily noticeable color, such as red. Furthermore, protruding in the forward direction from the right lower end of the principal part 44 is a circular plate 48, which is adapted to function as an opening/closing plug.

Figure 11:
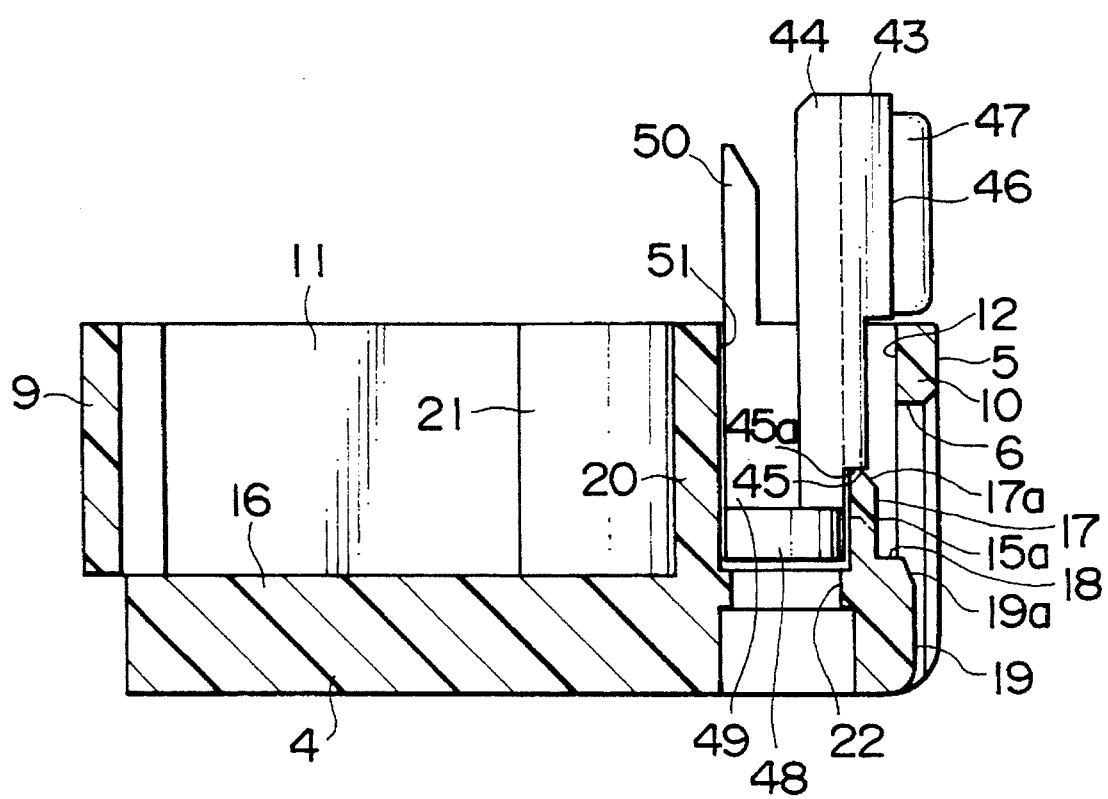
FIG. 11 is a cross-sectional view along a line XI—XI shown in FIG. 9.
Figure 17:
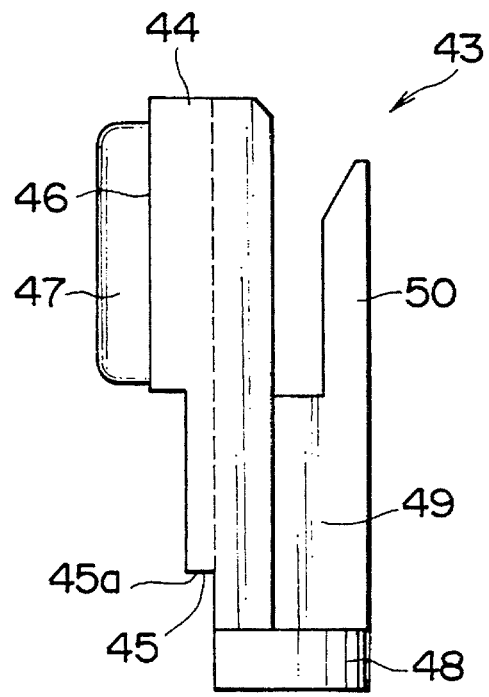
FIG. 17 is an enlarged right side view of the accidental-erasure prevention switch.

A rib 49 is formed on the upper surface of the opening/closing plug 48, as shown in FIGS. 2, 11 and 17. As shown therein, the height of the rib 49 is approximately half that of the principal part 44.

A click pin 50 protrudes in the upward direction from a front portion of the upper surface of the rib 49, as shown in FIGS. 2, 11 and 17. As viewed from above the click pin 50 as for example in FIG. 15, the rear surface of the click pin has a substantially circular arc shape.

The accidental-erasure prevention switch member 43 is mounted inside the cassette case 2 as described below.

The lower half of the accidental-erasure prevention switch member 43, that is, the portion beneath the display unit 46 is placed in a space 51 (see, for example, FIGS. 2, 11 and 20), which is defined by the rear wall 10, the right-side wall 11, the intermediate wall 13 and the limit wall 20 of the lower half 4. As a result and as shown in FIG. 11, an upper surface 45a of the cut 45 of the accidental-erasure prevention switch member 43 is placed on the upper edge of the weight wall 15a of the lower half 4.

The gadget pin 47 is placed inside the accidental-erasure prevention window 7. The upper half 3 is then joined to the lower half 4, such that the limit wall 33 of the upper half 3 is inserted between the upper half of the principal part 44 of the accidental-erasure prevention switch member 43 and the click pin 50, as shown in FIG. 21. As a result, the limit wall 33 is adjacent to the front surface of the upper half of the principal part 44 and, accordingly functions to restrict forward movement of the accidental-erasure prevention switch member 43.

As a result, the accidental-erasure prevention switch member 43 is mounted in the cassette case 2 and can be moved freely by an operator from the left to the right within the space 51.

Figure 18:
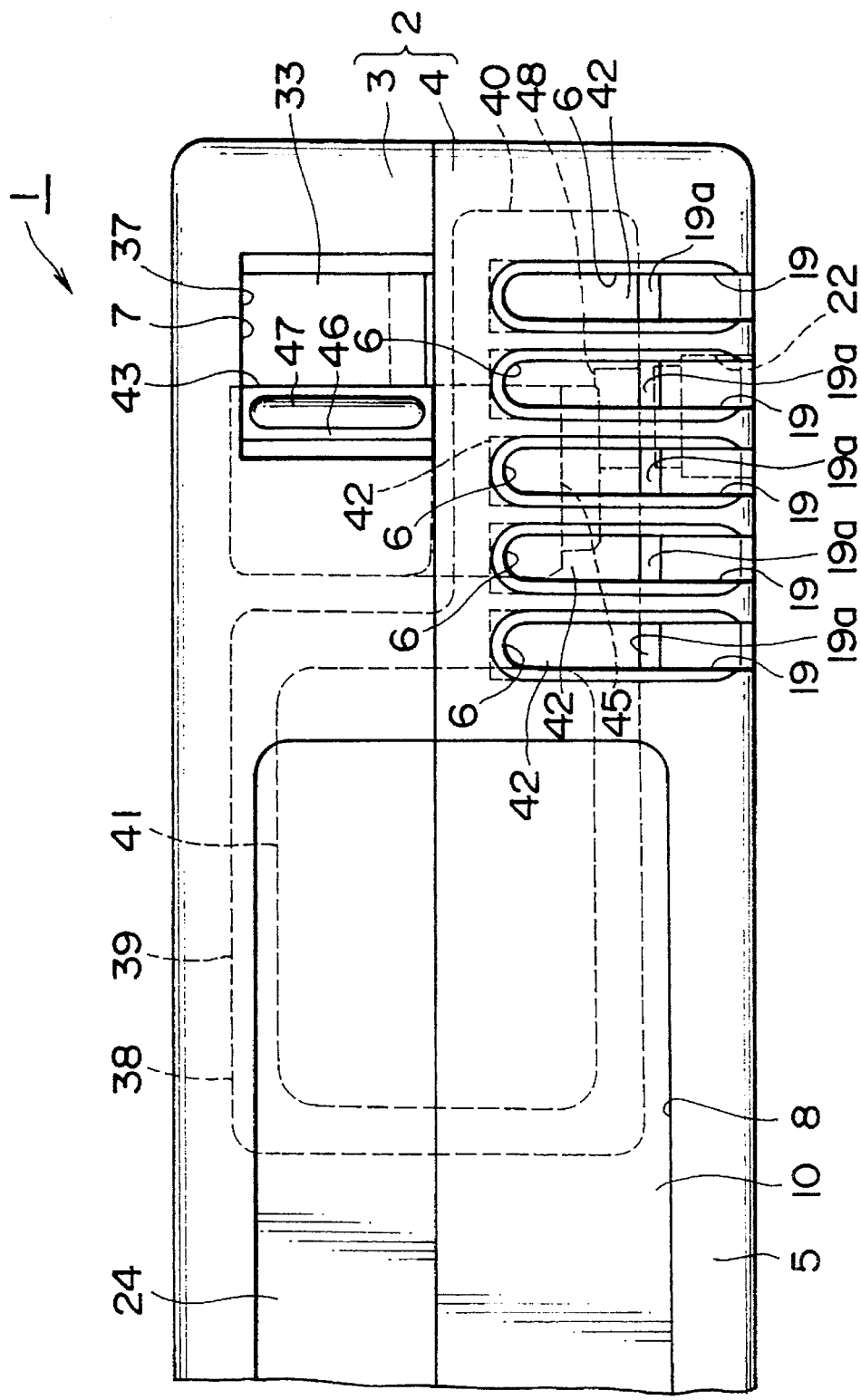
FIG. 18 is an enlarged partial back view of the cassette of FIG. 1 illustrating the accidental-erasure prevention switch in a recording-enabled position.
Figure 19:
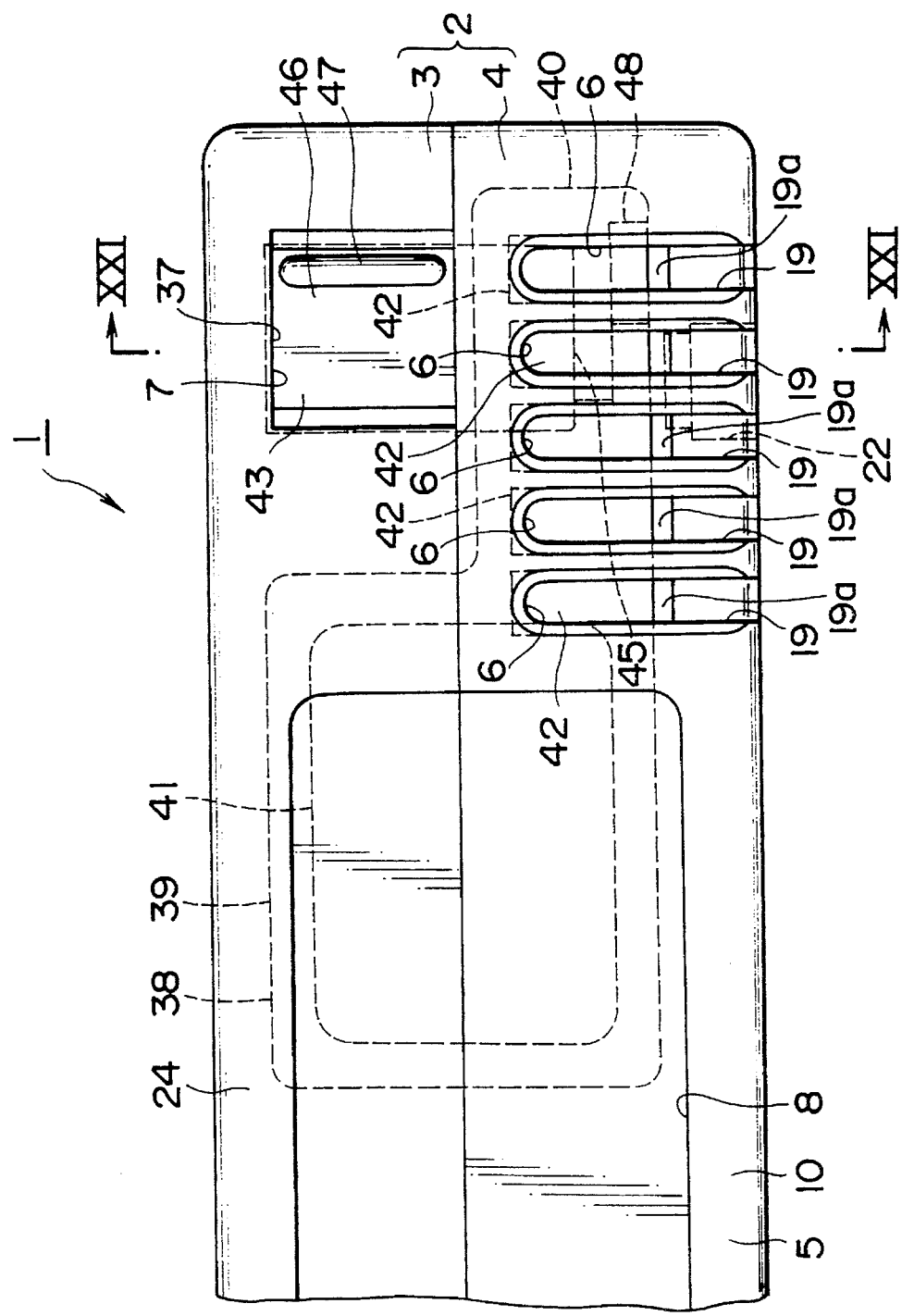
FIG. 19 is an enlarged partial back view of the cassette of FIG. 1 illustrating the accidental-erasure prevention switch in a recording-disabled position.

Thus, the accidental-erasure prevention switch member 43 is mounted in the cassette case 2 in such a way that it can be moved in a right-left direction within a range defined by the space 51. The left end of this range preferably corresponds to a write-enable position and the right end thereof preferably corresponds to a write-protect position. When the accidental-erasure prevention switch member 43 is positioned at the left end of the range (i.e., when the member 43 is in the write-enable position), the opening/closing plug 48 blocks the insert hole 22 of the cassette case 2, which may be detected by use of a spring-loaded insertion pin (not shown) or other such device in a recording/reproducing device 201 (FIG. 23) so as to allow data to be recorded. The location of the accidental-erasure prevention switch member 43, and in particular the gadget pin 47, when the member 43 is in such write-enable position is illustrated in FIG. 18. On the other hand, when the accidental-erasure prevention switch member 43 is positioned at the right end of the range (i.e., when the member 43 is in the write-protect position), the opening/closing plug 48 is away from the insert hole 22 of the cassette case 2 so as not to block the insert hole and open the same. Such open hole may be detected by the recording/reproducing device in a manner similar to that previously described, whereupon no data can be recorded. The location of the accidental-erasure prevention switch member 43, and in particular the gadget pin 47, when the member 43 is in such write-protect position is illustrated in FIG. 19.

Figure 20:
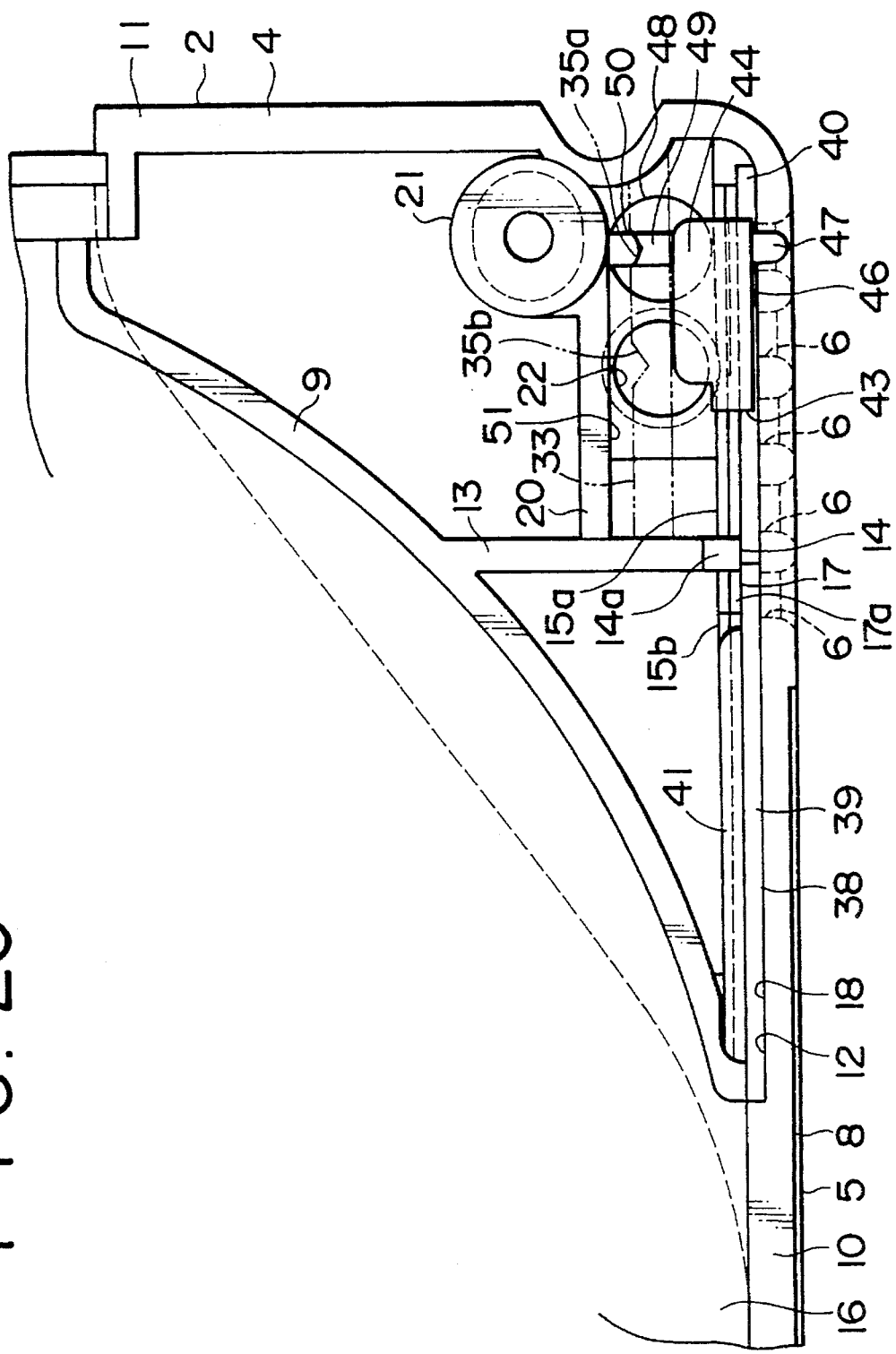
FIG. 20 is an enlarged partial top view of the cassette of FIG. 19 with the upper half of the cassette case removed.

When the accidental-erasure prevention switch member 43 is placed in the write-protect position, the click pin 50 is set in the click groove 35a (FIG. 20). On the other hand, when the accidental-erasure prevention switch member 43 is placed in the write-enable position, the click pin 50 is set in the click groove 35b. As a result, such arrangement and use of the click pin 50 and the click grooves 35a and 35b provide an indication to an operator of the desired one of the write-protect or write-enable positions and secures the accidental-erasure prevention switch member 43 thereat.

Thus, the accidental-erasure prevention switch member 43 permits the operator to determine, at a glance (for example, by observing the location of the gadget pit 47) whether or not data can be recorded onto the tape in the cassette.

As is to appreciated, when the accidental-erasure prevention switch member 43 is moved from the write-protect position to the write-enable position or vice versa, the force driving the accidental-erasure prevention switch member bends the click pin 50 so as to pull it away from the respective click groove 35a or 35b.

Although in the first embodiments illustrated in FIGS. 1–21, five exposure holes 6 are utilized, the present invention is not so limited and any number of such exposure holes may be utilized. For example, four exposure holes may be utilized.

As an example of a cassette having four exposure holes, reference is made to FIGS. 22A–D. As shown therein, a cassette 101 having a recording medium contained therein, such as a magnetic tape, includes a back surface 105 and a bottom wall 116. Arranged on the back surface 105 are four exposure holes 106 for respectively providing access to the terminals 42 and a window 107 for providing access to the accidental-erasure prevention switch member 43. As is to be appreciated, the location of such exposure holes 106 and the window 107 on the back surface 105 are similar to that of the exposure holes 6 and the window 7 of the cassette 1. An insert hole 122, corresponding to insert hole 22 of the cassette 1, is formed in the bottom wall 116. With the exception of the number of exposure holes, the cassette 101 is substantially similar to the cassette 1 and, as such, will not be further described herein.

A recording/reproducing apparatus 201 according to the present invention will now be described with reference to FIG. 23. Such recording/reproducing apparatus 201 may be utilized for recording information onto and/or reproducing information from the cassettes 1 and 101. Although either of cassettes 1 or 101 may be used with the apparatus 201, in the following discussion and in the interest of clarity, only cassette 1 will be described as being used with the apparatus 201.

As shown in FIG. 23, the recording/reproducing apparatus 201 includes a connector 52 having a plurality of connector pins 53 each adapted to contact a respective one of the terminals 42 of the tape cassette 1. In the interest of clarity only one connector pin 53 is shown in FIG. 23.

Each of the connector pins 53 is preferably fabricated from a wire spring-like material having a desired conductivity. Each connector pin 53 is formed in a shape similar to a "V" and arranged in the connector 52 such that one end thereof is fixed and a bent sub-portion 55a of a play or contact portion 55 protrudes from the front surface of a case 54 of the connector.

Accordingly, when the tape cassette 1 is inserted within the recording/reproducing apparatus 201 and moved in a downward direction therein towards a cassette mounting unit and positioned on a cassette mounting surface 203 of the recording/reproducing apparatus, the sub-portions 55a of the contact portions 55 of the connector pins 53 of the connector 52 are guided through the guide grooves 19 of the cassette case 2 so as to extend through the exposure holes 6 and respectively contact the terminals 42 of the board 38. As a result, information stored in the IC 41 (such as that previously described) may be read by a reader unit (not shown) coupled to one or more of the connector pins 53. Such read information may be utilized by the recording/reproducing apparatus 201 so as to operate in the desired manner.

In above-described situation, the terminals 42 are positioned deeper than the guide grooves 19. Holding the terminals by the sub-portions 55a of the connector pins 53 in the above-described arrangement may avoid peeling off from the board 38.

The connector pins 53 contact the terminals 42 with a predetermined elastic force and, accordingly, a corresponding stress is developed in the board 38. However, such stress may not adversely affect the IC 41. That is, the IC mount unit 39, upon which the IC 41 is mounted, is located away from the terminal layout unit 40 which is where such stress is initially developed. Further, the IC mount unit 39 is separate from the terminal layout unit 40. As a result, the IC 41 and a bonding part thereof may not be fatigued due to the stress. Such condition may enable a relatively large IC to be utilized.

Additionally, the height of the connector 52 is preferably no greater than the respective heights of members, such as a reel unlock member 56 and a reel base 57, which are inserted into the cassette case 2 when the tape cassette 1 is mounted into the cassette mounting unit and onto the cassette mounting surface 203. Alternatively, the height of the connector 52 may be no greater than the height of the highest one of the members inserted into the cassette case 2 during such insertion and mounting of the tape cassette 1. Although not shown, other members, such as a light emitting unit for detecting a tape end and a tape guide, may also be inserted into the cassette case 2 during the insertion and mounting of the cassette 1 into the recording/reproducing apparatus 201.

Further, when the tape cassette 1 is inserted into the recording/reproducing apparatus 201 it is slid in a horizontal direction at an altitude so as to avoid obstruction by the above-mentioned members which may be inserted into the tape cassette 1 and then lowered onto the mounting surface 203. By arranging the connector 52 so that the connector pins 53 contact the terminals 42 and such that the height thereof is not greater than those of at least one of the members inserted into the tape cassette 1 as previously described, the altitude at which the tape cassette is slid in the horizontal direction may not have to be increased as compared to that for a recording/reproducing apparatus without such a connector.

As a result, the height of the present recording/reproducing apparatus 201 may not be affected by the connector 52.

Tape cassettes according to other embodiments of the present invention will now be described with reference to FIGS. 24–27. In the interest of brevity, only the differences between these embodiments and that of the above-described cassette 1 will be described.

Figure 24:
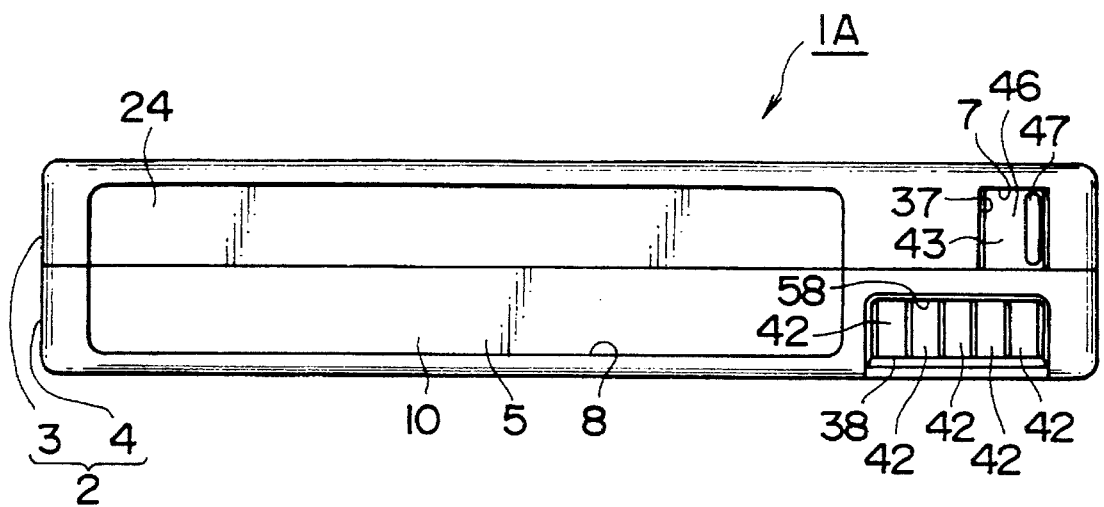
FIG. 24 illustrates a back surface of a cassette having a recording medium in accordance with a second embodiment of the present invention.

A tape cassette 1A according to a second embodiment of the present invention is illustrated in FIG. 24. As shown therein, the tape cassette 1A includes a single exposure hole 58 having substantially a rectangular shape and formed on the lower half 4. Such exposure hole 58 exposes or provides access to the terminals 42 on the board 38. The remaining portions of the tape cassette 1A are substantially similar to those of the tape cassette 1 and, as previously mentioned, will not be further described herein.

In the tape cassette 1, each of the exposure holes 6 exposes or provides access to a respective one of the terminals 42. As a result, each of the connector pins 53 of the connector 52 may access the respective one of the terminals 42 through the respective exposure hole and is prevented from contacting an adjacent one of the terminals. Although by utilizing only a single exposure hole 58 as previously described, the tape cassette 1A may not prevent such contacting of an adjacent terminal by a connector pin, all other advantages associated with the tape cassette 1 also apply for the tape cassette 1A.

Figure 25:
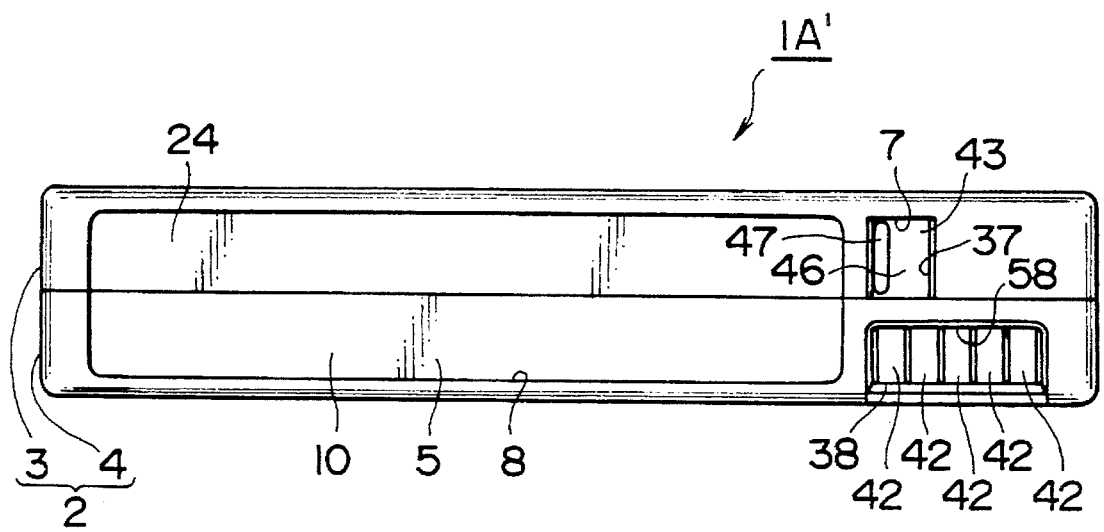
FIG. 25 illustrates a modification to the cassette of FIG. 24.

A modified version of the tape cassette 1A, that is, a tape cassette 1A' is illustrated in FIG. 25 As shown therein, the tape cassette 1A' substantially differs from the tape cassette 1A (FIG. 24) in the location of the accidental-erasure prevention window 7 That is, in the tape cassette 1A', the accidental-erasure prevention window 7 is located above the left portion of the exposure hole 58, whereas in the tape cassette 1A, such window 7 is located above the right portion of the exposure hole 58.

Figure 26:
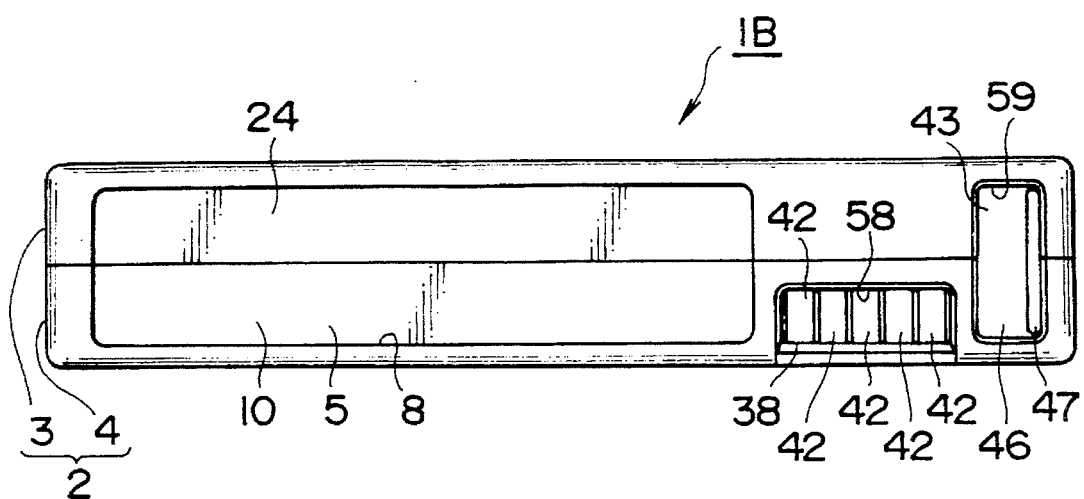
FIG. 26 illustrates a back surface of a cassette having a recording medium in accordance with a third embodiment of the present invention.

A tape cassette 1B according to a third embodiment of the present invention is shown in FIG. 26. Such tape cassette 1B basically differs from the above-mentioned tape cassettes with regard to the accidental-erasure prevention window. That is, as shown in FIG. 26, in the tape cassette 1B, an accidental-erasure prevention window 59 is formed which extends over the upper and lower halves 3 and 4, respectively.

Further, the tape cassette 1B, like the tape cassettes 1A and 1A', includes the exposure hole 58 on the lower half 4. Such location of the exposure hole 58 (and the terminals 42) in the tape cassette 1B, like in the tape cassettes 1A and 1A', enables the connector 52 in the corresponding recording/reproducing apparatus 201 to be arranged therein at a relatively low height in a manner as previously described.

Figure 27:
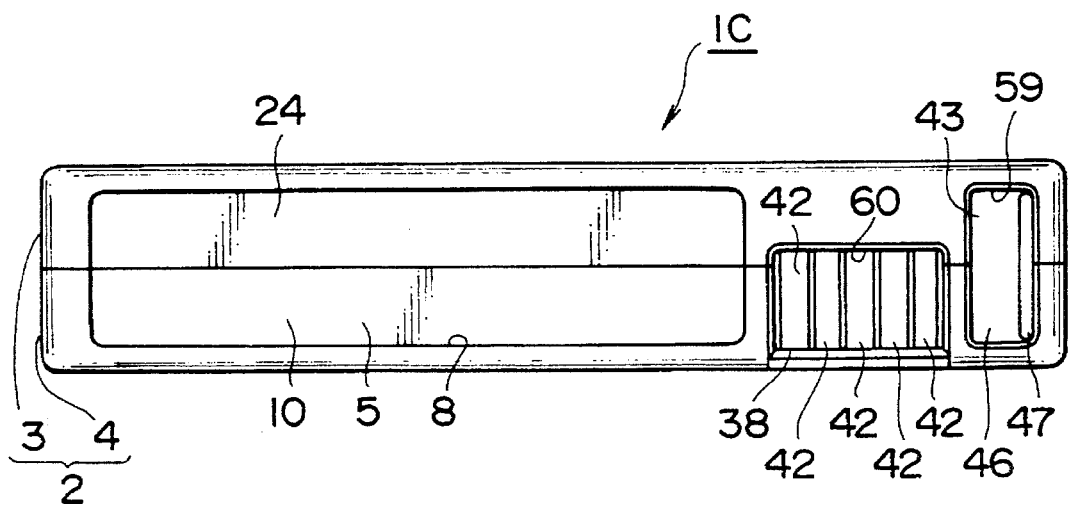
FIG. 27 illustrates a back surface of a cassette having a recording medium in accordance with a fourth embodiment of the present invention.

A tape cassette 1C according to a fourth embodiment of the present invention is shown in FIG. 27. As shown therein, the tape cassette 1C includes an exposure hole 60 for providing access to the terminals 42 and an accidental-erasure prevention window 59 for providing access to the accidental-erasure prevention switch member 43, in which the exposure hole 60 and the window 59 are formed so as to extend over the upper and lower halves 3 and 4, respectively.

The above-described arrangement of the exposure hole 60 and the window 59 may be advantageous in the fabrication of the tape cassette 1C. For example, such arrangement of the exposure hole 60 and the accidental-erasure prevention window 59 enables a relatively simple molding processing technique to be utilized in molding the upper and lower halves 3 and 4, respectively.

Thus, the present invention provides a tape cassette having a recording medium contained therein and a recording/reproducing apparatus for recording information onto and/or reproducing information from such tape cassette.

More specifically, the present tape cassette includes an accidental-erasure prevention switch member and a plurality of terminals which may be used for transferring information relating to the tape cassette and/or the recording medium to the recording/reproducing apparatus. The terminals may be accessed or contacted through at least one exposure hole located on an outer surface of the tape cassette by connector pins contained within a connector in the recording/reproducing apparatus. The switch member may be accessed by an operator by way of a window located on the outer surface of the tape cassette so as to set the switch member in a desired position which provides an indication of a desired one of a write-enable or write-protect modes to the recording/reproducing apparatus upon the installation of the cassette therein. Further, in the present tape cassette, the at least one exposure hole and the window are arranged so as to provide a relatively wide area on the outer surface thereof for fastening or sticking a label thereto.

As previously described, the present recording/reproducing apparatus may record information onto and reproduce information from the recording medium contained within the present tape cassette. Further, upon inserting and mounting the tape cassette into the recording/reproducing apparatus, such apparatus may receive information from terminals in the present cassette through a connector in the apparatus relating to the cassette and/or the recording medium and information indicating either of a write-enable or a write-protect mode due to the positioning of the switch member. Furthermore, the connector of the present recording/reproducing apparatus is arranged so as not to affect the height of the path of the cassette in the apparatus and/or the height of the cassette when mounted in the apparatus and, as such, enable the recording/reproducing apparatus to have a relatively small overall height.

Although the accidental-erasure prevention window and the exposure hole(s) were described as being located in a right portion of the back surface of the cassette, the present invention is not so limited. For example, such window and hole(s) may be located at the left portion or the center portion of the back surface of the cassette. Additionally, such window and hole(s) may be located on another surface or surfaces of the cassette.

Although illustrative embodiments of the present invention and modifications thereof have been described in detail herein, it is to be understood that this invention is not limited to these precise embodiments and modifications, and that other modifications and variations may be affected therein by one skilled in the art without departing from the scope and spirit of the invention as defined by the appended claims.

What is claimed is:

1. A cassette having a recording medium adapted for use with a recording/reproducing device, said cassette comprising:

a cassette case holding said recording medium therein and including an upper case and a lower case;

storage means for storing information pertaining to said cassette;

a plurality of terminals coupled to said storage means and adapted to be coupled to said recording/reproducing device when said cassette is being used with said recording/reproducing device so as to transfer the stored information to said recording/reproducing device;

means including a selectively movable portion having a display portion located in close proximity to said terminals for inhibiting recording of an information signal onto said recording medium and inhibiting erasing of a previously recorded information signal from said recording medium;

one of said upper and lower cases having at least one exposure hole therein aligned with and exposing said terminals so that said terminals may be accessed by said recording/reproducing device; and the other of said upper and lower cases having an opening aligned with said display portion of said movable portion of said means for inhibiting recording and erasing so as to provide access thereto.

2. A cassette having a recording medium adapted for use with a recording/reproducing device, said cassette comprising:

a cassette case holding said recording medium therein;

storage means for storing information pertaining to said cassette;

a plurality of terminals coupled to said storage means and adapted to be coupled to said recording/reproducing device when said cassette is being used with said recording/reproducing device so as to transfer the stored information to said recording/reproducing device; and means including a selectively movable portion having a display portion located in close proximity to said terminals for inhibiting recording of an information signal onto said recording medium and inhibiting erasing of a previously recorded information signal from said recording medium;

said cassette case having at least one exposure hole aligned with and exposing said terminals so that said terminals may be accessed by said recording/reproducing device; and further having an opening aligned with said display portion of said movable portion of said means for inhibiting recording and erasing so as to provide access thereto.

3. A cassette according to claim 2, wherein said cassette case has a back side which is the side of said cassette case first inserted into said recording/reproducing device and wherein said at least one exposure hole and said opening are located on said back side.

4. A cassette according to claim 3, wherein said at least one exposure hole and said opening are located at one end of said back side.

5. A cassette having a recording medium adapted for use with a recording/reproducing device, said cassette comprising:

storage means for storing information pertaining to said cassette;

a plurality of terminals coupled to said storage means and adapted to be coupled to said recording/reproducing device when said cassette is being used with said recording/reproducing device so as to transfer the stored information to said recording/reproducing device;

means including a selectively movable portion having a display portion located in close proximity to said terminals for inhibiting recording of an information signal onto said recording medium and inhibiting erasing of a previously recorded information signal from said recording medium; and a cassette case holding said recording medium therein, said cassette case having an upper case and a lower case wherein one of said upper and lower cases includes a plurality of exposure holes each exposing a respective one of said terminals so that said terminals may be accessed by said recording/reproducing device and the other of said upper and lower cases includes an opening aligned with said display portion of said movable portion of said means for inhibiting recording and erasing so as to provide access thereto.

6. A cassette according to claim 5, wherein said plurality of exposure holes are located on said lower case and said opening is located on said upper case.

7. A cassette according to claim 6, wherein said cassette further comprises a circuit board and wherein said storage means includes an integrated circuit (IC) chip mounted on said circuit board.

8. A cassette according to claim 7, wherein said circuit board has a relatively large rectangular shaped area and a relatively small rectangular-shaped area, and wherein said IC chip is mounted on said large rectangular-shaped area of said circuit board and said terminals are attached to said mall rectangular-shaped area of said circuit board.

9. A cassette according to claim 8, wherein said small rectangular-shaped area is located in close proximity to said means for inhibiting recording and erasing.

10. A cassette according to claim 9, wherein said terminals and said IC chip are located on the same side of said circuit board.

11. A cassette according to claim 7, wherein said exposure holes and said means for inhibiting recording and erasing are respectively located in close proximity to said circuit board.

12. A cassette according to claim 6, wherein said display portion of said movable portion of said means for inhibiting recording and erasing includes a rib which may be accessed through said opening by an operator so as to move said movable portion.

13. A cassette according to claim 6, wherein said cassette case has a back side which is the side of said cassette case first inserted into said recording/reproducing device and wherein said opening and said exposure holes are located on said back side.

14. A cassette according to claim 13, wherein said opening and said exposure holes are located at one end of said back side.

15. A cassette according to claim 13, wherein said lower case further includes a hole which can be covered and uncovered by said movable portion of said means for inhibiting recording and erasing so as to provide an indication to said recording/reproducing device of whether a recordable or erasable operation may be performed by said recording/reproducing device so as to record onto or erase information from said recording medium.

16. A cassette having a recording medium adapted for use with a recording/reproducing device, said cassette comprising:

storage means for storing information pertaining to said cassette;

a plurality of terminals coupled to said storage means and adapted to be coupled to said recording/reproducing device when said cassette is being used with said recording/reproducing device so as to transfer the stored information to said recording/reproducing device;

means including a selectively movable portion having a display portion located in close proximity to said terminals for inhibiting recording of an information signal onto said recording medium and inhibiting erasing of a previously recorded information signal from said recording medium; and a cassette case holding said recording medium therein, said cassette case having an upper case and a lower case wherein said lower case includes at least one exposure hole aligned with and exposing said terminals so that said terminals may be accessed by said recording/reproducing device and said upper case includes an opening aligned with said display portion of said movable portion of said means for inhibiting recording and erasing so as to provide access thereto.

17. A cassette according to claim 16, wherein said cassette case has a back side which is the side of said cassette case first inserted into said recording/reproducing device and wherein said at least one exposure hole and said opening are located on said back side.

18. A cassette according to claim 17, wherein said at least one exposure hole and said opening are located at one end of said back side.

19. A cassette having a recording medium adapted for use with a recording/reproducing device, said cassette comprising:

storage means for storing information pertaining to said cassette;

a plurality of terminals coupled to said storage means and adapted to be coupled to said recording/reproducing device when said cassette is being used with said recording/reproducing device so as to transfer the stored information to said recording/reproducing device;

a cassette case holding said recording medium therein, said cassette case having an upper case and a lower case wherein said lower case includes at least one exposure hole aligned with and exposing said terminals so that said terminals may be accessed by said recording/reproducing device; and means including a selectively movable portion having a display portion located in close proximity to said terminals for inhibiting recording of an information signal onto said recording medium and inhibiting erasing of a previously recorded information signal from said recording medium.

20. A cassette according to claim 19, wherein said cassette case further includes an opening which is aligned with said display portion of said movable portion of said means for inhibiting recording and erasing so as to provide access thereto.

21. A cassette according to claim 20, wherein said cassette case has a back side which is the side of said cassette case first inserted into said recording/reproducing device and wherein said at least one exposure hole and said opening are located on said back side.

22. A cassette according to claim 21, wherein said at least one exposure hole and said opening are located at one end of said back side.

23. A cassette having a recording medium adapted for use with a recording/reproducing device, said cassette comprising:

a cassette case holding said recording medium therein;

storage means for storing information pertaining to said cassette;

a plurality of terminals coupled to said storage means and adapted to be coupled to said recording/reproducing device when said cassette is being used with said recording/reproducing device so as to transfer the stored information to said recording/reproducing device; and means located in close proximity to said terminals for inhibiting recording of an information signal onto said recording medium and inhibiting erasing of a previously recorded information signal from said recording medium;

said recording/reproducing device includes a mounting surface for mounting said cassette, a connector adapted for connection with said terminals of said cassette when said cassette is mounted on said mounting surface, and at least one member each having a respective height which is inserted into said cassette when said cassette is mounted on said mounting surface, wherein said terminals are arranged within said cassette case and said connector is arranged within said recording/reproducing device so as to have respective heights from said mounting surface and wherein the heights of said terminals and said connector are less than the height of a highest member to be inserted into said cassette when said cassette is mounted on said mounting surface.

* * * * *